US006005945A

United States Patent [19]

Whitehouse

[11] Patent Number: 6,005,945

[45] Date of Patent: Dec. 21, 1999

[54] SYSTEM AND METHOD FOR DISPENSING POSTAGE BASED ON TELEPHONIC OR WEB MILLI-TRANSACTIONS

[75] Inventor: Harry T. Whitehouse, Portola Valley, Calif.

[73] Assignee: PSI Systems, Inc., Palo Alto, Calif.

[21] Appl. No.: 08/820,861

[22] Filed: Mar. 20, 1997

[51] Int. Cl.[6] .......... H04L 9/00

[52] U.S. Cl. .......... 380/51

[58] Field of Search .......... 380/51, 23–25; 705/408

[56] References Cited

U.S. PATENT DOCUMENTS

| | | | |
|---|---|---|---|
| 4,831,555 | 5/1989 | Sansone et al. | 380/121 |
| 5,077,795 | 12/1991 | Rourke et al. | 380/51 |
| 5,319,562 | 6/1994 | Whitehouse | 705/408 |
| 5,422,954 | 6/1995 | Berson | 380/51 |
| 5,602,921 | 2/1997 | Ramadei | 380/51 |
| 5,606,613 | 2/1997 | Lee et al. | 380/51 |
| 5,666,421 | 9/1997 | Pastor et al. | 380/51 |
| 5,712,787 | 1/1998 | Yeung | 705/408 |
| 5,799,093 | 8/1998 | French et al. | 380/51 |

*Primary Examiner*—Salvatore Cangialosi
*Attorney, Agent, or Firm*—Pennie & Edmonds LLP

[57] ABSTRACT

A system for electronic distribution of postage includes at least one secure central computer for generating postal indicia in response to postage requests submitted by end user computers, and at least one postal authority computer system for processing the postal indicia on mail pieces. A key aspect of the system is that all secure processing required for generating postal indicia is performed at secure central computers, not at end user computers, thereby removing the need for specialized secure computational equipment at end user sites. A secure central computer includes a database of information concerning user accounts of users authorized to request postal indicia from the secure central computer. A request validation procedure authenticates received postage requests with respect to the user account information in the database. A postal indicia creation procedure, applies a secret encryption key to information in each authenticated postage request so as to generate a digital signature and combines the information in each authenticated postage request with the corresponding generated digital signature so as to generate a digital postage indicium in accordance with a predefined postage indicium data format. A communication procedure securely transmits the generated digital postage indicium to the requesting end user computer. Each end user computer typically includes a communication procedure for sending postage requests to a secure central computer at which a user account has been established, and for receiving a corresponding digital postage indicium. A postage indicium printing procedure prints a postage indicium in accordance with the received digital postage indicium.

12 Claims, 8 Drawing Sheets

SYSTEM AND METHOD FOR DISPENSING POSTAGE BASED ON TELEPHONIC OR WEB MILLI-TRANSACTIONS

The present invention relates generally to electronic postage metering systems, and particularly to a system and method for securely dispensing postage using telephone and/or network based communication mechanisms.

BACKGROUND OF THE INVENTION

U.S. Pat. No. 5,319,562, entitled "System and Method for Purchase and Application of Postage Using Personal Computer," describes a cost-effective alternative to the classic mechanical or electromechanical postage metering devices used in the commercial business environment for the past 50 years.

The rental cost of conventional meters has impeded their widespread adoption. By way of example in the US market, as of 1997 there are only about 1.6 million postage meters in service. When compared to an estimated 20 million small businesses in the US, it is clear that conventional meters have never achieved the mass penetration that copy machines, FAX machines or PC's have. The primary reason is a perceived high (and recurring) cost which outweighs the convenience in the eyes of potential users.

In 1996 the US Postal Service published in the Federal Register draft specification for a system (coined the IBIP or Information Based Indicia Program) using the same basic concepts presented in U.S. Pat. No. 5,319,562. However, the USPS added a number of security and operational requirements that add substantially to the initial and ongoing cost of fielding a PC-based postage meter. The added USPS requirements have essentially priced the technology out of the reach of the small PC-based mailer, with monthly costs estimated to be more than a conventional entry-level mechanical or electro-mechanical meter.

This document describes a method of electronically dispensing postage using PC-based system that retains the cost viability of the original PC-based postage application system disclosed in U.S. Pat. No. 5,319,562, while simultaneously meeting the host of additional requirements imposed by the USPS. The present invention also provides the technical means for postal agencies such as the USPS, UK's Royal Mail, or France's La Poste, or the newly-formed Postage Fee-For-Service bureaus, to compete with conventional meter vendors by directly dispensing postage with integral, digitally signed indicia data to end users electronically on a mail piece-by-mail piece basis. The mail piece-by-mail piece disbursement approach has strong parallels to so-called "micro-transactions" or "milli-payments," which are the subject of considerable focus for Internet applications.

In addition to serving end user mailers, the present invention can be used to dispense postage strips at postal agency retail sites (e.g., Post Office counters). This technology could replace the expensive, non-IBIP meter strip technology which is currently in use at such locations.

Referring to FIG. 1, U.S. Pat. No. 5,319,562 describes a postage management and printing system using common personal computer components, including a printer 11*b*, modem 11*c*, and non-volatile local memory to store balance and other key data. U.S. Pat. No. 5,319,562 also presented a proposed postage mark of simple design that expressed the fundamental information required by the USPS—city and state of origin, date of issue, amount of postage and meter number. The '562 patent also proposed that each mail piece be assigned a unique serial number, and barcode representations of the postage amount and numerical identifiers.

The mail pieces produced by the system of the '562 patent would contain a complete and verified delivery address, a barcode for facilitating automated routing and sorting of mail pieces, and a postal indicium (i.e., a stamp or postal mark) that contains, at minimum, the following information:

Postage Amount
Date
City of Origin
Postage Meter Number
Piece Serial Number

The postal indicium information could take the form of human-readable text and/or a barcoded representation.

The fundamental anti-fraud mechanism taught in the '562 patent was premised on the mailing authority (e.g., the USPS) checking for uniqueness of the meter/serial number combination during automated processing of the mail. If a duplicate meter/serial number combination was detected, the mail piece could easily be intercepted, or at minimum, a graphic image of the mail piece could be captured.

The ultimate reliance on the aforementioned anti-fraud approach is mandated by the way in which indicia are created in this new venue—using commonly available desktop printers (e.g., with laser, inkjet, or matrix printers) using standard (typically black) inks. This type of mark is very easily replicated (e.g., by a conventional photocopier). In contrast, conventional postage meters produce a phosphor traced, red ink mark. In addition, conventional meters are required to slightly "emboss" the material on which they print. As a result, it is reasonably difficult to replicate the imprint of a conventional postage meter.

A facsimile of a test mail piece created on a personal computer and mailed by officials of the USPS on Sep. 12, 1996 appears in FIG. 2. The indicium includes all of the information discussed in U.S. Pat. No. 5,319,562, some in human readable form and some represented in a PDF-417 two dimensional barcode. The barcode contains a host of information, including the meter number and a unique serial number for the mail piece, as taught in U.S. Pat. No. 5,319,562.

The USPS specifications require use of the PDF417 indicium barcode, although other two dimensional barcodes such as the DataMatrix are also under consideration. The USPS is currently requiring that the barcode contain nearly 500 characters of information. Some of this data are attributable to an attempt to incorporate letter/parcel tracking information, and part is to accommodate an encryption signature and accompanying public key information which is used in combination to provide a "self-authenticating" feature to the mail piece.

The indicium encryption signature (and more specifically the associated FIPS-140-level secure hardware required to generate this signature at the user's PC), along with the USPS requirement to have a local CD-ROM subscription containing all USPS ZIP+4 address information, has driven the costs of a PC-based metering system beyond what can be reasonably tolerated by the marketplace.

The encryption signature in the proposed USPS IBIP indicium barcode can not prevent counterfeiting by simple duplication, and that fact is recognized by the USPS. The USPS states that the goal of using the IBIP indicium barcode is to produce an "indicium whose origin cannot be repudiated". It's intended use is for manual spot sampling of pieces in the mail stream for a period of up to 5 years. During this 5 year period, the USPS plans to simultaneously ramp up the necessary equipment to provide for 100% automatic scanning of these mail pieces.

Ironically, when the USPS achieves the 100 percent scanning capability, they will no longer need an encryption signature, because capturing the unique meter number and piece serial number and comparing that to a national database will immediately identify counterfeit or suspect pieces.

Following the "interim logic" of the USPS, using a barcode reader and a public decryption key, a Postal Inspector could examine a given mail piece and compare the printed destination address with the ZIP+4 embedded in the PDF417 barcode. This would insure, at minimum, that the indicia was properly synchronized with the actual delivery address printed on the mail piece. It would prevent counterfeiters from simply scanning (copying) an otherwise valid barcode and placing it on another mail piece which has a different destination ZIP+4.

However, until scanning and verification of the postal indicia on all mail pieces is available, the "interim logic" will not capture duplicate counterfeits which simply have the same destination address or even the same ZIP+4.

The Proposed USPS IBIP Open System

FIG. 3 is derived from a Oct. 8, 1996 USPS Publication entitled "Information Based Indicia Program—Host System Specification". The sole amendment to the original USPS figure is the box labeled "Address Verification". This element does not appear in the original USPS figure, but it's function and relative location were described in the accompanying USPS text. Basically, this figure outlines the current USPS concept of a PC-based metering system. It is important to note that the diagram shown in FIG. 3 is quite generalized because the USPS wants to consider this approach for.

- an entirely new generation of PC-based metering systems; as well as
- a technology replacement for conventional mail room electro-mechanical postage meters.

In particular, the representation in FIG. 3 or a "customer provided input" is generalized to cover a standard PC keyboard/mouse as well as a postage meter keypad, scanner, PC-based controller, or other device.

The block labeled "Host System" is simply, in the case of a PC-based metering system, a standard desktop PC with printer. The host system in postage meter configuration might be a complex electro-mechanical device (including a print engine) for intensive mail room metering operations.

The block labeled PSD (for Postal Secure Device) is viewed as an external, active processing device with an integral non-volatile storage whose mission is multifaceted. The PSD functions include secure storage of local postage balances, creation of digitally signed indicia information, and the support of secure transmission capabilities between the user and the Vendor (e.g., the Postage Meter Manufacturer such as Pitney Bowes, Neopost, etc.) and/or the user and the USPS (or similar postal agencies in other countries).

A final block, Address Verification, is a CD-ROM containing an address lookup engine and a national ZIP+4 directory, which must be incorporated into the USPS IBIP System. The USPS Oct. 8, 1996 specification explicitly states that "Section 3 required that the host system developers use the USPS-developed Address Matching Systems (AMS) software and the USPS ZIP+4 National Directory". This is an annual CD subscription which is updated 6 times per year and sold for $120/yr to $600/yr depending upon the vendor.

The PSD is a significantly more aggressive and complex component than originally described in US Pat. No. 5,319,562, where a secure, non-volatile memory was use to store and securely maintain balance information. It evolved from the USPS's imposed requirement that virtually every transaction undertaken by the IBIP system be digitally encrypted.

Some of the stated missions of the PSD are:

- secure balance storage;
- secure date/time maintenance (using an on board clock);
- creation of digitally signed indicia messages (to be represented in a 2-D barcode);
- management of secure transmissions between the user and the Vendor and/or USPS;
- multi-year battery lifetime;
- secure storage of encryption keys;
- storage of X.509 data certificates;
- a communications mechanism to interact with the host, and in turn with the USPS and Vendor; and
- compliance with FIPS-140 cryptographic and physical security standards.

The digital encryption specified by the USPS is based on the Public/Private key concept introduced by Stanford University Professor Martin Hellman and his graduate student, Mr. Whitfield Diffie, in 1976. Data messages can encrypted and decrypted using a combination of these keys. The keys may also be used to "digitally sign" messages in such a way that the recipient is confident of the origin and authenticity of the content of the message.

While the users PC could perform the necessary digital encryption process, it is well known that the standard PC environment can be monitored, and encryption computations that can be monitored can eventually be deciphered by an attacker. Therefore, the USPS has firmly rejected the use of the user's PC to perform encryption tasks. Instead, the USPS has specified that any PC performing postage metering and postage acquisition function will have use a PSD that meets FIPS-140 standards. This secure device would interact with the user's PC (or the more general Host System) via a serial cable (for instance). The Host System would remain completely ignorant of the message content, and would pass this message either to a printer (for mail piece creation) or to the USPS/Vendor for some type of transaction (such as a postage purchase).

Of course, if the postal service were to scan the digitally metered postage of all postage items, such a high level of security is likely not needed, since virtually all types of fraudulent postage metering would be automatically detected during the postage scanning process. The simple presence of a unique Meter and Serial number (in a barcode or in OCR readable form) on every digitally metered mail piece would provide an absolutely secure system.

In essence, the PSD is simply a replica of the "heart" of a conventional electro-mechanical postage meter. Conceptually, the PSD has done away with the direct user interface and printing capability in a conventional meter, and replaced this with communications mechanisms so that other devices can accomplish these tasks. The PSD is simply a reflection of the long standing industry understanding of "what a meter is".

Like conventional meters, the USPS mandates that the PSD be tracked from "cradle to grave". Tracking requirements for conventional postage meters are complex, bureaucratic and expensive. Postal Agencies worldwide are gravely concerned about "rogue meters" whose physical location becomes unknown (due to theft, for instance) and have been compromised to essentially generate unlimited postage. This is one reason why the "meter head" of a conventional meter can never be sold in the United States—the USPS requires that it only be rented (and thus owned/tracked by the four firms who currently can sell meters in the US).

When a conventional meter rental agreement is signed between a Vendor and an end user, here is a list of some of the actions that are required. Importantly, the "new" PSD will require most, if not all, of these steps.

1. The end user must complete an extensive USPS form to be filed both with the Vendor and USPS 2. At the vendor's factory, and under the eyes of USPS Inspectors, a specific meter must be seeded with initial data that associates that meter uniquely with the new end user.

3. The meter is shipped to the end user's local Post Office where it is "enabled" for operation by the USPS and entered into the administrative control of that office.

4. The meter is then installed at the end user's site by a representative of the Vendor. Additional enabling codes are then entered into the meter.

The meter is now ready for operation.

Once in service, meters must be periodically inspected visually by USPS representatives. In the case of older style mechanical meters, which are carried to the local Post Office for re-crediting, the inspection takes place during the re-crediting process. In the case of telephonically re-credited meters, the inspection must take place at the end user's site.

If the user cancels the contract, a similar withdrawal procedure must be followed where the device moves through the local Post Office for disabling and then to the Vendors secure manufacturing site for de-initialization and possible reuse with another customer.

If a meter fails in the field and there is sufficient proof that the meter contained a non-zero balance, the end user can apply for a refund transaction.

Like conventional meters, the USPS is requiring that PSD's not be sold on store shelves (e.g., a computer software retail outlet), but instead must be carefully disseminated and tracked by the Vendor, just like conventional meters. This process alone adds very significant costs which must be passed on to the end user.

In contrast to the USPS requirement for a local CD-ROM subscription of the US National ZIP+4 directory, a telephone and/or Web-based Dial-A-ZIP protocol, is currently operational nationwide for free public use. This same Dial-A-ZIP directory technology is used internally by the USPS national network infrastructure to provide address verification for USPS corporate mailings.

Dial-A-ZIP is a simple one step process that submits an address to the very same US National ZIP+4 directory and returns the so-called standardized address, ZIP+4, carrier route and other postal data. On the Web, the response time for this process is typically 1 second. In the dial-up mode, the process takes 20–30 seconds because of the dialing and modem connect time.

Dial-A-ZIP is an appropriate, USPS-certified, and cost-effective ZIP+4 validation technique that is ideal for the small and medium sized mailer who might use the PC-based metering system of the present invention. The present invention incorporates Dial-A-ZIP within a broader context of solving the overall metering problem. In fact, the invention can be thought of an extension of a Dial-A-ZIP transaction.

The postage dispensing system design depicted in FIG. 3 follows the methodology of both conventional meters and the PC-based meter described in U.S. Pat. No. 5,319,562. That is, the local user-based system serves as a repository for unused (i.e., available) postage and manages the dispensing of that postage on a piece by piece basic. This type of postage dispensing system design brings with it the requirement for stringent and costly security measures at each user's site.

The present invention is based in part on the observation that standard USPS security and operational requirements make it not cost-effective to maintain postage balances and indicia generation at the local user level. Rather, in accordance with the present invention, these secure operations are removed completely from the end user's environment and instead accomplished at either the a postal Vendors site (e.g., Pitney Bowes) or at the agency's site (e.g., the USPS, or the UK Royal Mail). A secure communication between the user and a secure central site would occur just prior to the creation of each and every mail piece. A much less frequent mode of communication would also occur when the user requests an increased postage balance, which is maintained at the central site. As a result, all operations requiring compliance with standard postal security requirements would be performed as secure central sites, eliminating most of the security overhead costs that have to date made the use of desktop computer-based postal dispensing systems impractical.

SUMMARY OF THE INVENTION

A system for electronic distribution of postage includes at least one secure central computer for generating postal indicia in response to postage requests submitted by end user computers, and at least one postal authority computer system for processing the postal indicia on mail pieces. A key aspect of the system is that all secure processing required for generating postal indicia is performed at secure central computers, not at end user computers, thereby removing the need for specialized secure computational equipment at end user sites.

A typical secure central computer includes a data processor; and a database of information concerning user accounts of users authorized to request postal indicia from the secure central computer. A request validation procedure authenticates received postage requests with respect to the user account information in the database. A postal indicia creation procedure, applies a secret encryption key to information in each authenticated postage request so as to generate a digital signature and combines the information in each authenticated postage request with the corresponding generated digital signature so as to generate a digital postage indicium in accordance with a predefined postage indicium data format. A communication procedure securely transmits the generated digital postage indicium to the requesting end user computer.

Each end user computer typically includes a data processor and a communication procedure for sending postage requests to a secure central computer at which a user account has been established, and for receiving a corresponding digital postage indicium. A postage indicium printing procedure prints a postage indicium in accordance with the received digital postage indicium. Each postage request will typically include a user account identifier that identifies a previously established user account, a source address identifier indicating where a mail piece is to be mailed from, a destination address identifier indicating where the mail piece is to be mailed to, authentication information for authenticating that the postage request is from an end user associated with the specified user account identifier, and data concerning the package size and/or weight sufficient to determine an amount of postage required for the mail piece. Each digital postal indicia will typically include data representing the user account identifier, source address identifier, and destination address identifier in a corresponding on of the postage requests.

In a preferred embodiment, to avoid the need for digital signature certificates, a unique key identifier is assigned to each secret encryption key used to create the digital signatures in postal indicia, and each generated digital postal indicium includes data representing the key identifier of the secret encryption key used to generate the digital signature in that digital postal indicium.

Each postal authority subsystem typically includes a data processor and a database of information concerning the user accounts. A postal indicium validation procedure authenticates the postal indicium on each mail piece. The validation procedure includes instructions for decrypting the digital signature in the postal indicium using a decryption key corresponding to the key identifier in the postal indicium.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

While the present invention is described below with reference to a few specific embodiments, the description is illustrative of the invention and is not to be construed as limiting the invention. Various modifications may occur to those skilled in the art without departing from the true spirit and scope of the invention as defined by the appended claims.

Figure 4:
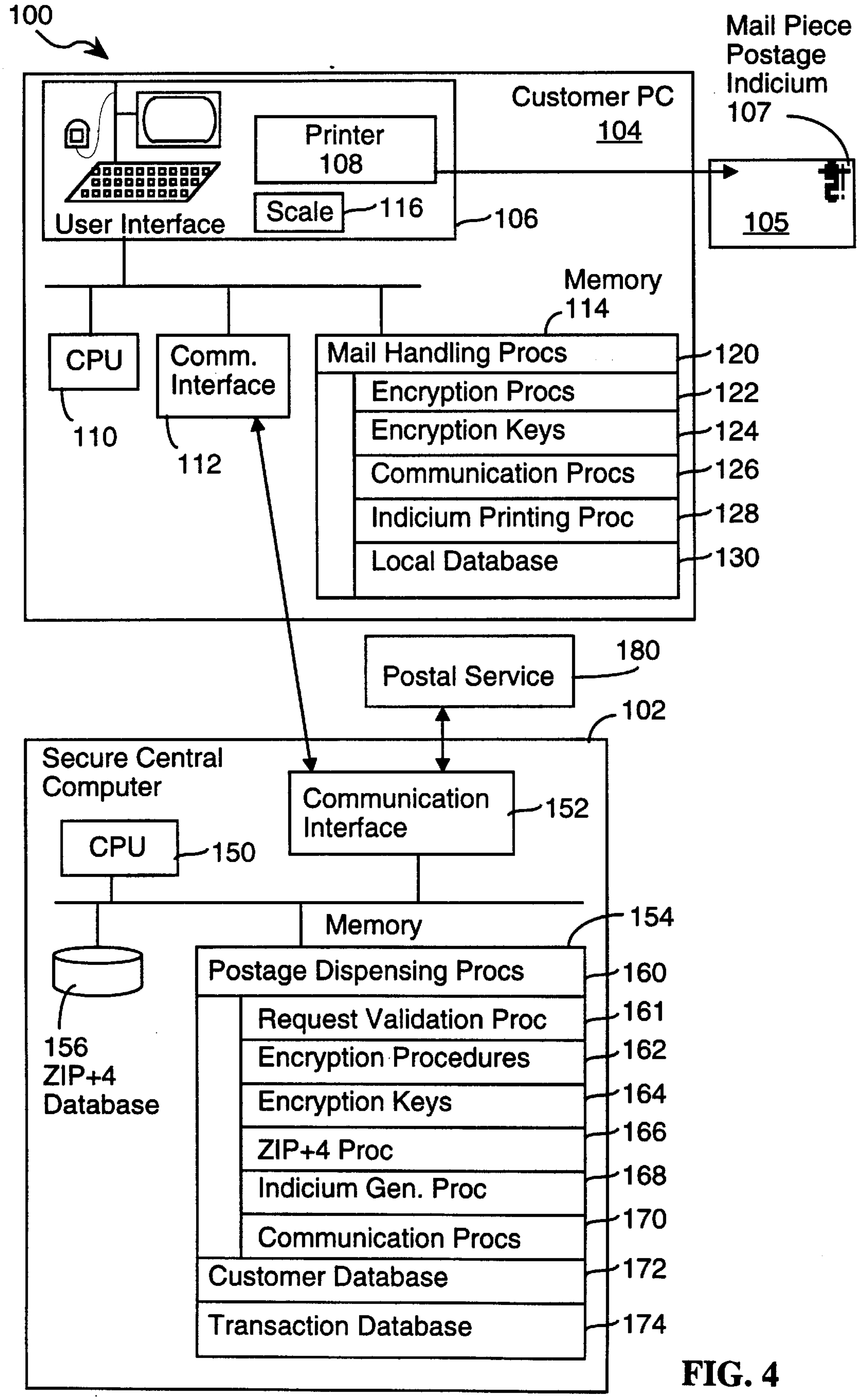
FIG. 4 is a block diagram of a secure postage dispensing system in accordance with the present invention.

FIG. 4 shows a distribute postage generation system 100 in accordance with a preferred embodiment of the present invention. One or more secure central computers 102 are used as the principle devices for generate postage indicia for many users, who use desktop computers 104 (herein called PC's) to receive the postage indicia and print mail piece labels 105 that each include a corresponding digital postage indicium 107 received from one of the secure central computers 102. The customer PC's contain conventional computer hardware, including a user interface 106 with a printer 108, a data processor (CPU ) 110 for executing programs, a communication interface 112 such as a modem, LAN connection, or Internet connection, for handling communications with one of the secure central computers 102, and local memory 114. The user interface 116 may also include a scale 116 for weighing mail pieces, or a separate scale may be used to provide mail piece weight information.

Local memory 114, which will typically include both random access memory and non-volatile disk storage, preferably stores a set of mail handling procedures 120, including:

- message encryption and decryption procedures 122;
- encryption keys 124 needed to send and receive messages from the secure central computer 102;
- a communication procedure 126 for handling communications with the secure central computer 102;
- an indicium printing procedure 128 for printing two dimensional barcode indicia corresponding to postage indicia messages received from the secure central computer 102; and
- a local database 130 of information needed by the mail handling procedures, including local account balance information and transaction records representing all recent postage purchase transactions by the customer PC 104.

Each secure central computer 102 includes a data processor (CPU ) 150 for executing programs, a communication interface 152 such as a bank of modems, a LAN connection, or an Internet connection, for handling communications with the customer PCS services by the secure central computer 102, local memory 154, and a ZIP+4 or ZIP+4+2 database 156.

Local memory 154, which will typically include both random access memory and non-volatile disk storage, preferably stores a set of postage dispensing procedures 160, including:

- a postage indicium request validation procedure 161 for validating requests from end user computers for postal indicia;
- message encryption and decryption procedures 162;
- encryption keys 164 needed to generate the digital signatures in postal indicia, and keys for secure communications with the postal authority computer system 180;
- a ZIP+4 or ZIP+4+2 procedure 166 for generating a ZIP+4 or ZIP+4+2 value for each destination address specified in a postage request message received from any of the customer PCS;
- an indicium generation procedure 168 for generating a sequence of bits representing a postage indicia corresponding to a destination address specified by a customer PC, including a procedure for digitally signing each postage indicium; and
- a communication procedure 170 for handling communications with the customer PCS 104.

Local memory 154 in the secure central computer also preferably stores:

- a customer database 172 of information about each of the user accounts serviced by the secure central computer 102; and
- a transaction database 174 for storing records concerning each postage indicium generated by the secure central computer 102 and each postage credit transaction in which funds are added to a user account.

Each secure central computer 102 is also connected by the communication interface 152 to one or more postal service computers 180. The postal service computers 180, which are used to process mail pieces, need access to the databases in the secure central computers when verifying the postage indicia on mail pieces. For instance, if the serial number on a mail piece is sufficiently different from the serial numbers on other mail pieces recently processed for the same meter, the postal service computer may request a copy of the meter's recent postage purchase history to determine if the postal indicia on the mail piece being processed is authentic. More generally, if a postal indicia on a mail piece is determined to be fraudulent, or is merely suspected of being fraudulent, the postal service computer may request data concerning the associated meter from the secure central computer 102 so that the fraud or suspected fraud can be further investigated.

Note that only mail handling software resides in each end user's computer 104. No secure hardware is used at the local site, no USPS ZIP+4 CD-ROM is required locally, and no communications port is consumed for a PSD. The secure computer 102 at a central site contains all of the customer account information, current balances, a transaction log for each customer, details on each mail piece indicia dispensed, and encryption software and keys. Furthermore, the encryption procedures 122 required for end user computers are relatively modest, because the encryption of client/server messages is used only to protect the privacy of those communications and are not used to protect the generation of postal indicia. This is an important distinction. The secure central computer 102 generates postal indicia using secure mechanisms and transmits the resulting postal bit pattern to the end user's computer for printing on a mailing label or envelope. The encryption of client/server communications helps to prevent casual theft of postal indicia and eavesdropping on the postal indicia requests being made, but nothing more.

In one preferred embodiment, the end user encryption procedures 162 include both public/private key encryption/decryption and symmetric key encryption/decryption capabilities. However, the public/private key encryption/decryption capability of the end user encryption procedures 162 is used only for establishing and changing the session key associated with the end user computer's "meter" account. In particular, in one preferred embodiment the secure central computer 102 is configured to periodically replace the session key for each meter account with a new randomly generated key. The new key is sent to the end user computer in a message that is encrypted with the end user computer's public key, and is decrypted by the end user computer using the corresponding private key. Alternately, but somewhat less secure, the new session key can be transmitted to the end user computer using a message encrypted with the previous session key, thereby avoiding the need for private/public key encryption in the end user's computer.

In yet another alternate embodiment, the new session key can be generated by requesting the end user computer to generate a public/private key pair and to send the public key to the secure central computer. The end user computer and the secure central computer can then both independently generate a new session key as a function of each computer's private key and the other computer's public key, using a well-known technique called "Diffie-Hellman" session key generation. The advantage of this technique is that the end user computer only needs symmetric encryption/decryption software and key generation software for making public/private key pairs and session keys, but does not need public/private key encryption/decryption software.

In the preferred embodiments, the session key for each meter is replaced every K (e.g., 25) transactions, or after the current session key has been in use for more than a predefined period of time (e.g., a week), whichever is earlier.

Because communication between the secure central computer 102 and the end user's computer 104 is required for each and every mail piece created, the communication requirements for this invention are substantially greater than those contemplated in U.S. Pat. No. 5,319,562 and its subsequent USPS IBIP incarnation. However, as of 1997, there are a number of reasons to believe that a postage dispensing system with such communication requirements is viable:

1. The exponential growth of the World Wide Web (hereinafter called the "Web") and other part of the Internet, as well as internal corporate Intranets, has greatly reduced the unit cost and overall complexity of an electronic communication transaction. For instance, many PC user's have unlimited dial-up access to the Internet at low flat monthly rates. Many corporations have networks with 24 hour gateways to the World Wide Web, so that each PC in the organization has instant access to any Internet or Web resource.

2. Because of dramatically-improved networking infrastructure, most transaction-based computer programs are migrating to a "client-server" topology. That is, applications (and to some extent, business models) are being structured so that data is being stored centrally on a "server". A host of authorized "clients" run a local program that draws upon data from the server as required. The only data transferred to and from a given client relates to the specific activity that the client is undertaking.

3. Direct, automated telephonic connections between a user and a host server (via modem) are commonplace. A small mailer (say 10 pieces per day) could post each of her mail pieces with a simple 30 second phone transaction that was completely automated. A typical call to a national 800 number indirectly costs $0.20/minute (i.e., the costs associated with the 800 number are indirectly passed onto end users). For that user, the added telephonic cost for his 10 mail pieces would be $2.00. While this is a non-trivial surcharge, it is probably less than the cost imposed by a rented PSD device, the USPS requirement for local ZIP+4 verification (with attendant CD-ROM subscription), and the bureaucratic costs of tracking secure hardware in the field, which must be passed on to the customer in transaction charges, monthly rental or software upgrades.

Data Stored by the Secure Central Computer

The data stored by the secure central computer 102 in its customer database for each meter/user account preferably includes, but is not limited to:

Meter/License Number
Account status (active, hold, canceled, etc)
Account Name
Account Password
User's Name
User's Company
User's Street Address
User's City
User's State
User's Postal Code
Descending balance
Ascending balance
Current piece count (last serial number used)
Origin/Finance ZIP5 (for US market)
Origin/Finance City
Origin/Finance State Date Initially Placed in Service Date of last transaction Maximum postage allowable per indicium Minimum allowable balance Minimum re-credit amount Maximum re-credit amount User's cryptographic session key Account Comments For each meter or account, at least two child transaction tables are maintained in the transaction database 174. The first is a record of postage purchases which memorializes:

Date/Time Postage Dispensed

Amount of transaction

Type of Funds Transfer (e.g., credit card, check, etc.)

Identifying ID (e.g., credit card number, check number)

The second transaction table records each postage indicium dispensing event and includes:

Date/Time of Transaction

Piece Number (serial number)

Weight

Mail class

Amount

Destination address information

Public key reference number (indicating which key was used by the central computer to digitally sign the postage indicium for this postage dispensing event).

It is this second transaction file that will require the largest amount of data storage on the secure central computer. Conceivably, billions of transactions might be logged per year. For instance, the US mail system currently processes approximately 30 to 40 billion mail pieces per year that carry either a stamp or meter mark (of the 170 billion mail pieces processed in total).

While such transaction volume is undeniably huge, there are precedents. For instance, the VISA Corporation computers manage over 8 billion credit card transactions annually. The storage burden could be lessened by such techniques—using the US market as an example—as storing the ZIP+4+2 delivery point digits of each destination address in lieu of the complete address. For most cases, these 11 digits identify a specific building on a specific street in a specific city/state. It is also important to note that the meter balance is the most important active data to be maintained, while the transaction files could be archived or even deleted after a period of time.

Note that storing data on the central computer (with industry-standard backup, of course) offers very distinct advantages over conventional meters or the PSD. The meter balances are stored on computer media rather than secure non-volatile meter registers. Furthermore, the presence of a detailed postage expenditure log on the secure central computer allows for a recompilation of the balances at any time—something that conventional meter technology can't offer.

"Unofficial" Data Stored at the User's Site

For convenience and operational speed, a copy of current balance and a transaction log of each postage indicium purchase is kept the on the customer PC. This allows for rapid report generation and balance checking without contacting the secure central computer. These local values may be stored in non-secure files as the ultimate data reference (e.g., the "balance of record, official transaction summaries") is the secure central computer.

The local transaction log may store more detailed data than would be required for audit purposes. For instance, in the US model, while the destination address of a mail piece can be represented fairly well by the ZIP+4+2 (the last two digits being the delivery point digits), which would be a sufficient representation of the destination address for audit purposes, the local transaction log may store the full name and address of each destination address to provide a more readable log file. As taught in U.S. Pat. No. 5,319,562, the local transaction log would also provide the opportunity to charge postage transactions to certain internal accounting codes—useful for internal accounting at the end users site but irrelevant to the Postal authorities audit function.

The Postage Dispensing Milli-Transaction

Figure 5A:
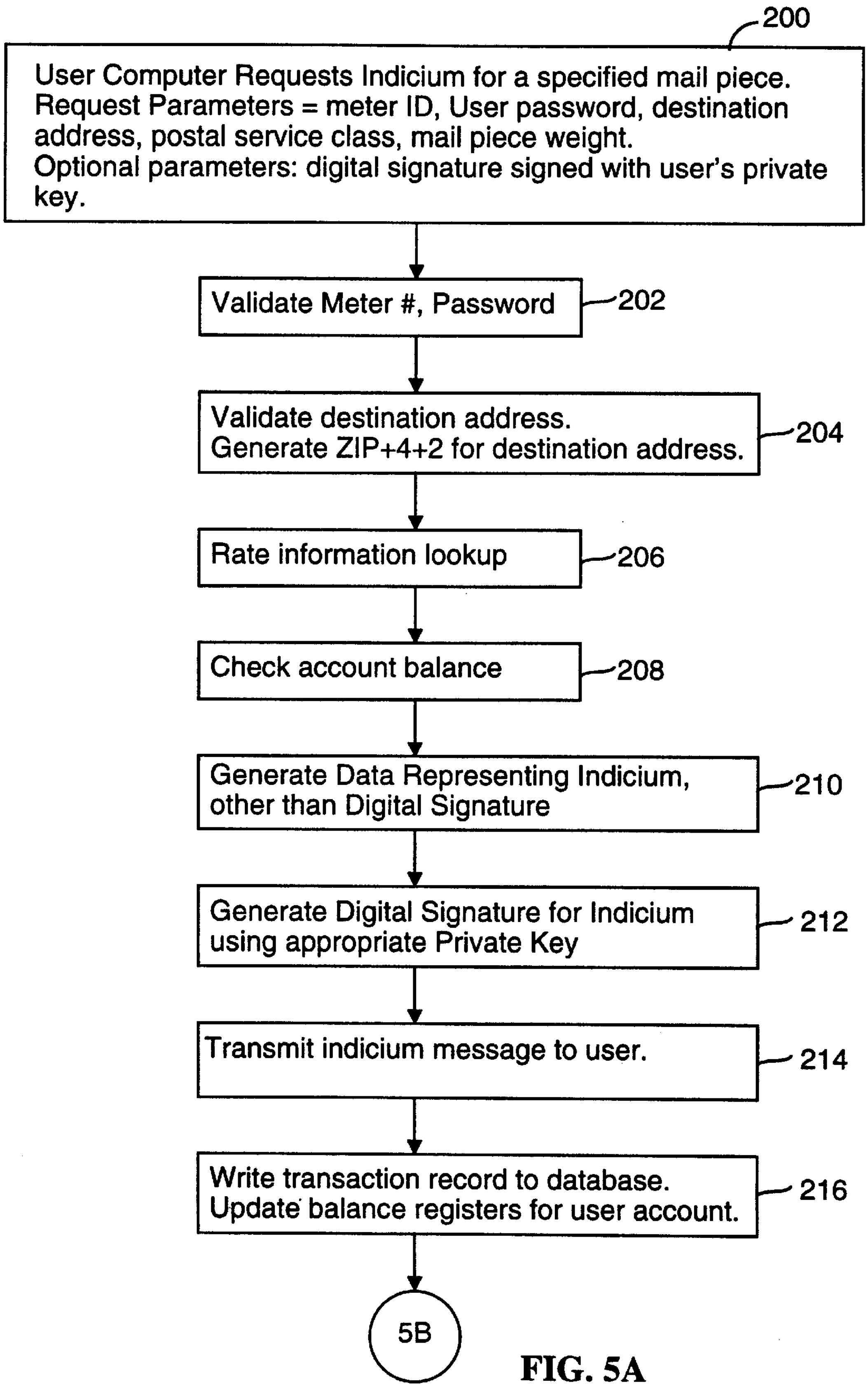
FIGS. 5A and 5B are a flow chart depicting steps performed by a postage request verification procedure and postal indicium generation procedure in a preferred embodiment of the present invention.
Figure 5B:
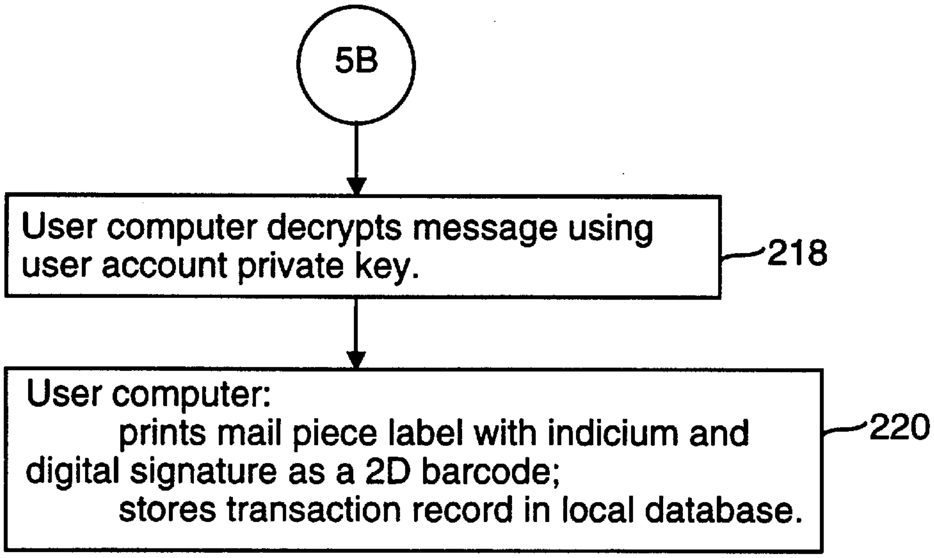
Figure 6:
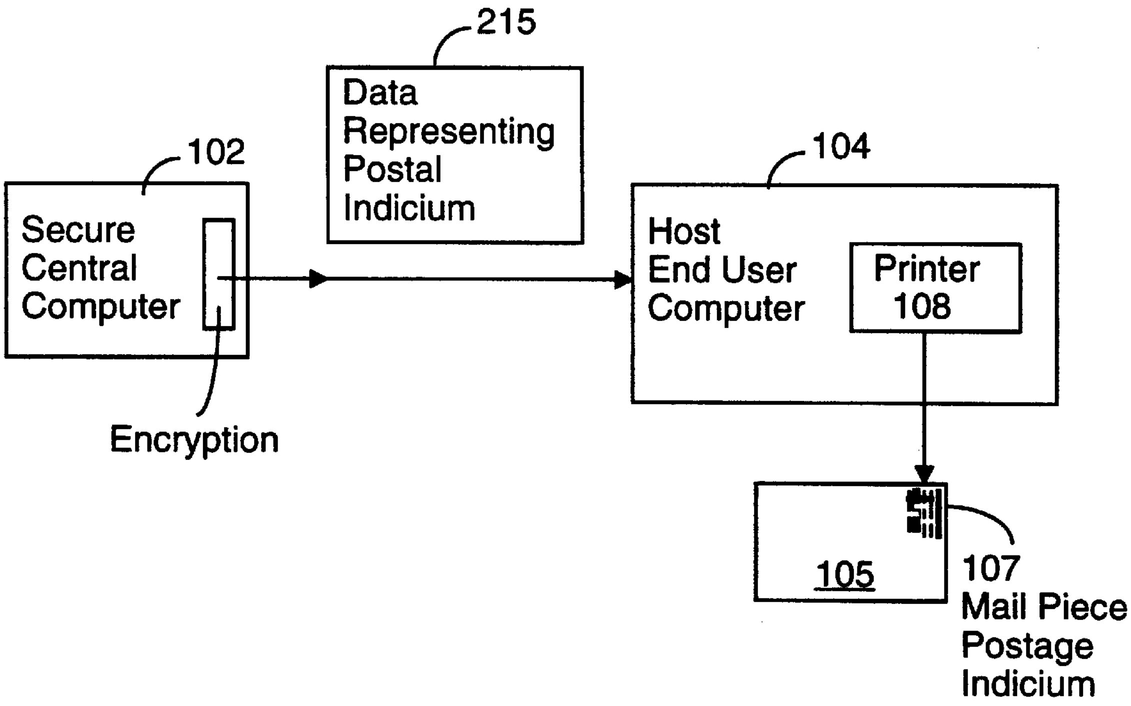
FIG. 6 is a flow chart depicting a postal indicium transaction in accordance with the present invention.

Referring to FIGS. 5A–5B and 6, the procedures for validating a postage dispensing request and then dispensing postage for a single mail piece are as follows. The user's computer requests a postage indicium from the secure central computer at which it has a postage dispensing account (200). The request includes the users meter or account ID, the user account password, the destination address is a standardized format suitable for ZIP+4 lookup the postal service class to be used for shipping the mail piece, and the mail piece weight.

In a preferred embodiment, to ensure the integrity of each postage indicium request, the request is encrypted with a previously established session key known only to the end user's computer and the secure central computer 102. In a preferred embodiment, the encryption method used to secure the request is a standard symmetric key encryption. The request message will generally include a CRC or other error detection code so that corrupted messages can be detected.

While the use of symmetric key encryption is preferred because it is computationally efficient, and the number of milli-transaction is expected to be very high, much greater security can be afforded in an alternate embodiment by (A) including in the request message a digital signature signed with a private key assigned to the user account, and/or (B) encrypting the request message with a public key known to belong to the secure central computer. Encrypting the entire message with the public key protects the confidentiality of the transaction and prevents tampering with the contents of the message (because it is impossible for any entity other than the central secure computer to know the content of the request message), but does not prevent the submission of counterfeit requests. Including a user digital signature in each request message prevents the submission of counterfeit requests because the central secure computer, which stores a copy of the public key for each user account, will verify the digital signature before accepting the request message as authentic. However, as stated above, it is believed that using symmetric key encryption with periodically updated session keys for each user account will provide more than sufficient security for protecting postal indicium requests and replies.

The central computer, after decrypting the request message, validates the postal indicium request by verifying the digital signature, if any, in the request, and validating the meter or account ID and account password in the request message (step 202, by validation procedure 161). If the meter/account ID does not correspond to an active postage dispensing account, or if the password is incorrect, an error message is returned to the request sender.

Otherwise, the destination address is validated and a ZIP+4 or ZIP+4+2 value is generated for the destination address (204). The validation of the destination address and ZIP+4+2 value is optional. In particular, if the user computer sending the request is using software that has previously validated the destination address and generated a ZIP+4+2 value in the last N (e.g., 6) months, and that prior validation is denoted in the postage request message, step 204 is skipped. Next, rate information for the mail piece is obtained from a rate lookup table and the postage for the mail piece is computed (206). The meter/account balance is checked to ensure that the meter/account has sufficient funds to pay for the current mail piece (208). For some accounts, small overdrafts may be allowed, or charges to the user's credit card or other financial account for a specified balance increase may be automatically generated to increase the meter/account balance whenever the balance is insufficient to pay for the postage on a mail piece.

Next, the postage indicium (except for a digital signature) is generated (210). The indicium is generated by concatenating a set of data bits representing a predefined sequence of information to be included in every postage indicium.

In one preferred embodiment, the data included in each postage indicium generated by the central secure computer is as follows:

| Element | Byte count |
|---|---|
| License ID | 10 |
| Serial Number | 8 |
| Date of Mailing | 6 |
| Postage | 5 |
| Origin: ZIP + 4 + 2 | 12 |
| Destination ZIP + 4 + 2 | 12 |
| Software ID | 8 |
| Ascending Register | 12 |
| Descending Register | 9 |
| Rate Category | 13 |
| Encryption Key ID | 4 |
| Digital Signature | 128 |

The license ID and serial number together uniquely identify each mail piece. The encryption key ID indicates which key was used to generate the digital signature.

Next, the secure central computer generates the digital signature (212) using an appropriate private key, and adds it to the other parts of the postage indicium generated at step 210. There are a number of ways of determining the private key to use for generating the digital signature, and this topic is discussed below separately.

A message including data representing the postage indicium with the digital signature is encrypted using the public key associated with the requesting user account (214), and then the resulting message 215 is transmitted to the requesting user. In addition, a transaction record reflecting the generated postage indicium is written to the transaction database in the secure central computer and the balance registers for the user account are updated in accordance with the amount of postage dispensed (216).

The user computer decrypts the postage indicium message using the user account private key (218), prints the mail piece label with the indicium and digital signature in the message as a two dimensional barcode, and stores a corresponding transaction record in its local database (220).

One benefit of the present invention becomes evident when one examines how postage balances are classically maintained in conventional meters (as well as the PC-based USPS IBIP), and one compares that approach with the approached used in the present invention.

The classic approach periodically transfers relatively large sums of financial credit from the postal agency to the meter or PSD. Typically, these transfers range from $50 to several thousand dollars. This amount is added to whatever balance remains in the local device, to arrive at a new balance. Then, as mail pieces are individually metered (or in the case of the IBIP, created and simultaneously "metered"), this locally stored postage value is decremented by the transaction amount (e.g. 32 cents). The security problem posed by this approach is substantial. The integrity of the local balance must be protected and this is typically addressed by physically sealing the meter body or, in the case of the IBIP PSD, requiring that the unit meet FIPS-140 security standards. Since there are millions of meters in service—all in customer locations—this alone is a substantial security risk.

In addition, the crediting transaction (wherein addition money is "added" to the unit) must be protected. In the case of mechanical or electro-mechanical meters, securing the funding transaction is accomplished by several means. Older meters must be physically taken to the nearest Post Office where a special lead seal is removed, the balance updated with special tools, and a new seal is installed. Newer meters in the marketplace as of 1997 allow for a transfer of encrypted information by human voice or electronic means (e.g., modem) which affects a balance update.

The integrity of the balance update transaction depends upon a coordinated encryption/decryption between the funding entity (typically a postage meter vendor) and the end user. For conventional electronic meters, the encryption is based on a complex formula involving the internal meter ID, the amount of postage required, the descending and ascending registers in the meter, the date and other variables. Security in this transaction is absolutely critical because the dollar amount is frequently substantial, and because the funds transferred are more or less "unmarked". The reference to "unmarked" will be better explained in the next paragraph.

The present invention completely abandons the concept of a locally maintained postage balance. Instead the official balance for any given user is maintained at the centralized secure computer. The balance may be increased at any time by the user through any number of secure means (e.g., a check taken to a local post office, funds mailed, or credit card transactions via the Web). All of these postage increase transactions are handled by the central secure site where standard payment verification techniques can be applied before the balance is actually updated.

FIG. 6 underscores another aspect of the security offered by this invention. When funds are drawn against a license (meter) account's balance, contact must be made with the central secure computer and all relevant information about the mail piece must be conveyed for this transaction to be successfully processed. The information returned amalgamates the proper amount of postage and the delivery information for this particular mail piece—and it is this information that is used to create a two-dimensional IBIP barcode. The associated "funds transfer" (i.e., postage indicium transfer) to the local site is not only a relatively small amount (the postage for a single letter or parcel) but the funds are "marked". That is the funds involved with the transaction are inexorably linked to both the mail piece's destination, originating location, weight and character. Therefore, if someone intercepts or steals this information electronically, it is of extremely little value to them. In fact, the indicium is so information laden, that it would be absolutely foolish for one to attempt to use it.

For instance, the postage indicium generated by the present invention is only valid for a mail piece with a given meter and serial number, for delivery from a particular ZIP+4 source location to a particular ZIP+4 destination location, and for a particular mail piece weight and a particular type of delivery service and for mailing on a particular date. Therefore, any attempt to use a stolen or intercepted postage indicium for delivery from or to a different ZIP+4 destination than those associated with the postage indicium would be immediately detected at the processing postal office. Also, even if the intercepter meets the ZIP+4 source and destination requirements, the use of two or more postage indiciums having the same meter number, and serial number will be quickly detected at the processing postal office. Delayed use of the intercepted postage indicium will be blocked by requirements that each postage indicium be used in a timely manner (e.g., within 3 days, or possibly a week of issuance of the postage indicium).

In the preferred embodiment, there is no local decryption of the postage indicium message—it is simply passed through the local host device (which acts only as a communications device) and printed in a barcoded format.

Let's give a specific example. Suppose Ms. Smith of Palo Alto, Calif. had a valid account with the postal authority and was extracting mail piece transactions routinely using the Internet. An attacker, Mr. Bart in Redmond, Wash. found either a way to intercept (or copy) the indicium information being transmitted to Ms. Smith and used that to create a IBIP postage indicium on a mail piece. The postage indicium would be laden with information regarding Ms. Smith's local in Palo Alto, and the destination address she had intended, whereas the human readable address on Mr. Bart's counterfeit piece would contain an entirely different destination address.

Postal automation equipment in Redmond or Seattle Wash. would scan this piece during normal outbound processing and electronically compare the information in the indicium with the human-readable address on the piece. Not only would the destination addresses (based on the ZIP+4+2 or similar information) be different, but the origin would be noted as Palo Alto Calif.—certainly no where near the Seattle/Redmond area. As a result, the mail piece with the counterfeit postage indicium would be automatically detected by the processing postal center.

In other words, the only transmitted information used by the present invention that can be intercepted electronically is so thoroughly marked with mail piece specifics that ifts value to an attacker is virtually nil.

Or let us assume that the attacker is somehow able to convince the central secure computer that he is Ms. Smith and somehow is allowed to perform transactions against her account. He would then submit what would appear to be valid transactions, using destination addresses that Mr. Bart supplied, and he would receive in return a perfectly valid and synchronized indicium data stream to create the required bar code. The present invention strongly discourages this attack in part because Mr. Bart must steal funds in small increments and, in part, because each theft provides additional information about Mr. Bart's operations.

Ms. Smith would quickly detect that her balance is incorrect (the present invention provides for an automatic check between an "unofficial" balance maintained by the user's PC and the official balance maintained by the secure compute after each transaction) and this fact would be reported to the authorities (either automatically when Ms. Smith makes her next valid transaction or by specific action on the part of Ms. Smith). The authorities could begin their investigation with a list of addresses mailed to by Mr. Bart. Investigators could simply contact each of the recipients and ascertain who they have in common insofar as Mr. Bart.

It should be stressed that this invention incorporates digital security procedures that will make any of the aforementioned "interceptions" extremely difficult. But the point remains, that even if security is somehow breached, the value of the stolen goods is nil or close to nil to the thief.

In summary, the present invention allows for major fund transactions to be accomplished in conventional and highly secure ways, but without the need for costly local encryption or special user hardware. And the present invention provides for mail piece indicium transactions which are so heavily "marked" that they are virtually useless to the thief.

The Role of Public/Private Keys in Indicium Creation and Authentication

Figure 1:
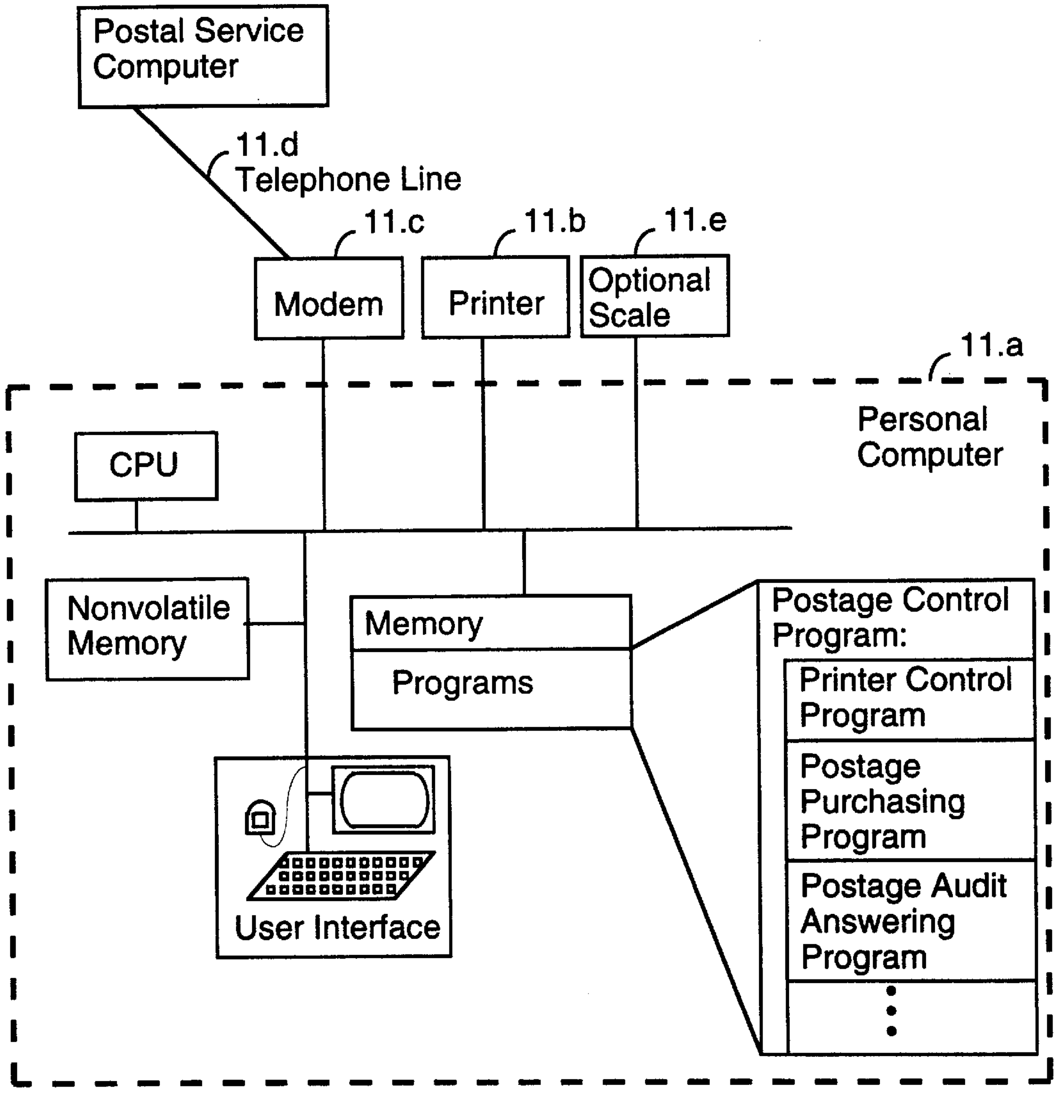
FIG. 1 is a block diagram of a desktop computer-based postage dispensing system as taught in U.S. Pat. No. 5,319,562.
Figure 2:
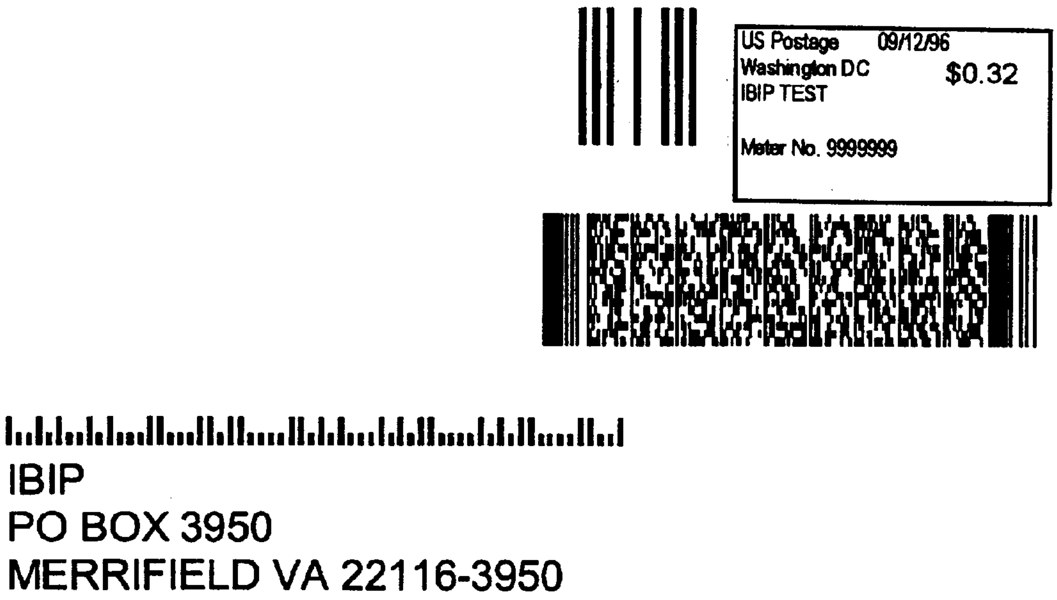
FIG. 2 depicts a facsimile of a test mail piece created on a personal computer and mailed by officials of the USPS on Sep. 12, 1996.
Figure 3:
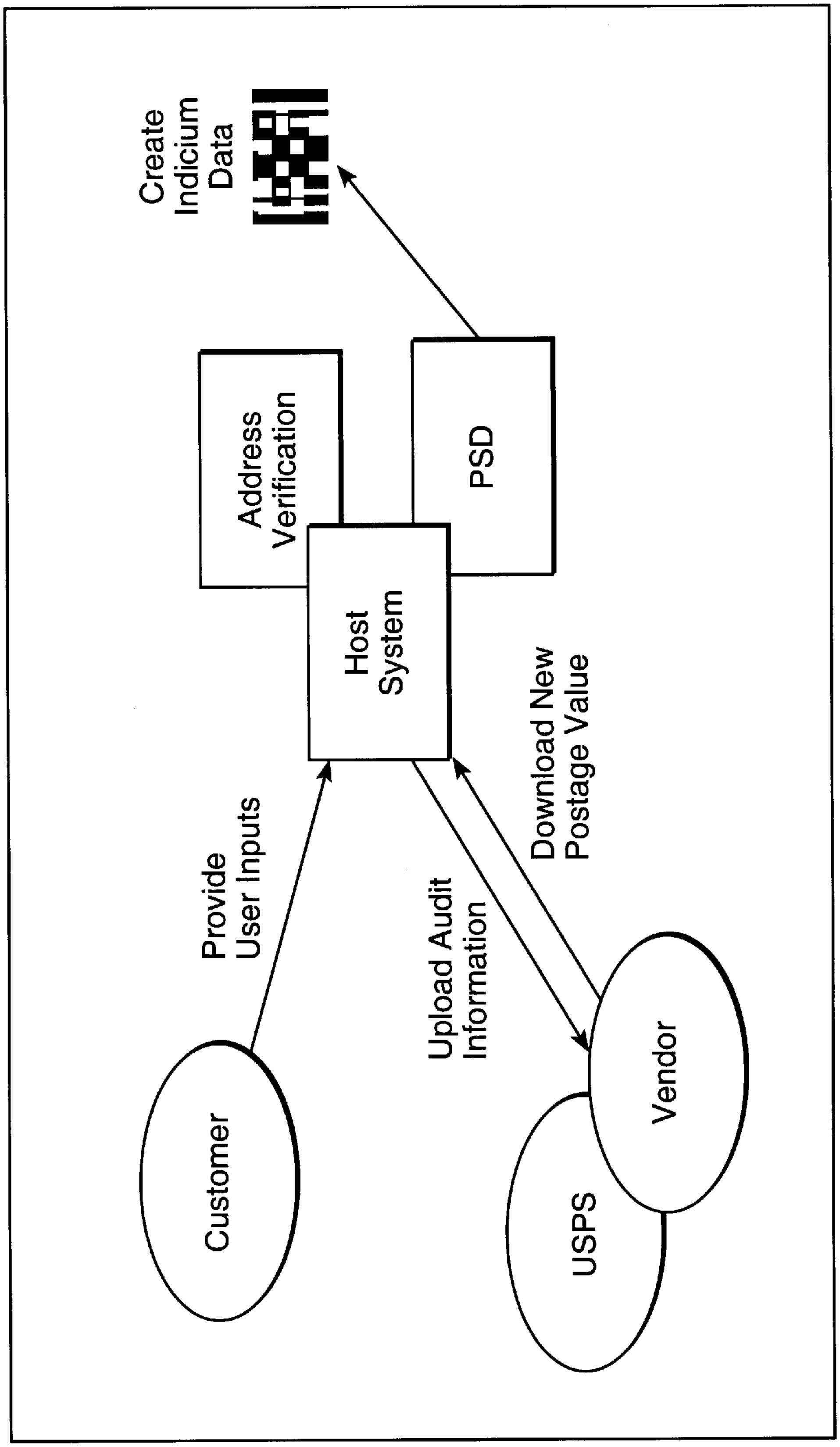
FIG. 3 depicts a postage dispensing system design consistent with methodology of both conventional meters and the PC-based meter described in U.S. Pat. No. 5,319,562.

In the USPS IBIP scheme, the 2-D barcode (see FIG. 2) represents a data stream associated with the associated mail piece. The USPS has proposed the following specific data elements:

| Element | Byte Count |
|---|---|
| Signature Algorithm Flag | 1 |
| Device ID/Type | 14 |
| License ID | 10 |
| Date of Mailing | 6 |
| Postage | 5 |
| Origin City, State, ZIP | 12 |
| Destination ZIP + 4 + 2 | 12 |
| Software Version ID | 12 |
| Ascending Register | 12 |
| Descending Register | 9 |
| RSA Digital Signature | 128 |
| X.509 Certificate | 323 |
| Rate Category | 13 |
| Reserve | 20 |

The stated USPS objective of "producing an indicium whose origin cannot be repudiated" is addressed by two fields associated with digital security—the RSA (or comparable) digital signature and the associated X.509 certificate. These two elements are at the heart of the Diffie-Heliman private/public key security protocol.

An attempt to thoroughly describe private/public key digital security protocol in any detail is well beyond the scope of this document. But the essence of the approach is as follows. Through various complex "modular" mathematical operations involving two large prime numbers, it is possible to develop a matching key set—a public and private key. These keys are comprised of hexadecimal characters and are typically several hundred characters long. These matched keys have some very unique properties that can be used to protect and/or authenticate a data stream. Consider the following (fictitious) matched key pair:

Private Key: XAFxfEFSXus12cZDrzRasdf44zg78cgaer129nwtgk[=tru .... 1024 characters total
Public key: jMxfdac3xads=4c-zff .... 380 characters total One can use the private key to "digitally sign" any data. This is done using an industry-standard encryption computation, but is done in a secure computational environment so that the private key is never revealed to anyone other than the originator of the message and signature. For instance, our data message might be:

Madonna makes a great Evita!

This data could be signed with the private key, and the signature appended or pre-pended to the actual message. So the message stream might now look like this:

Madonna makes a great Evita!*18azX30zr& where the characters starting with the asterisk represent the digital signature of the data message derived from the private key. This message may be now released to anyone.

The public key can be made available to anyone who wishes to authenticate the integrity of this message. The "container" for the public key is an X.509 certificate. There are other data in the x509 certificate, but they are not important for the immediate discussion. In the USPS indicia specification, the X.509 certificate (and hence public key) is simply included in the overall data stream. In other cryptographic applications, the X.509 certificate is transmitted separately from the actual message.

Anyone who has the public key can employ commercially-available computational algorithms to examine the message ("Madonna makes a great Evita!") and the digital signature (*18azX30zr&) and determine if the signature matches. The verification operation produces a TRUE or FALSE value. A TRUE value indicates that neither the message nor the signature have been modified since the digitally signed message was created. As a result, A TRUE value indicates that this message was truly signed by the person or entity associated with the public key used to examine the message. Further, the X.509 certificate will generally identify the person or entity associated with the public key.

Now suppose someone tampers with the original message somewhere in the transmission process, and the recipient instead saw the following data stream along with the public key:

Madonna makes a great Mom!*18azX30zr&

Since the signature hasn't been modified, the signature verification process would fail (i.e., yield FALSE). The attacker could try to modify both the message and the digital signature, but would have virtually no hope of synchronizing the modified signature with the modified message. Practically, he would need to have the private key (which is never purposely divulged.) for a non-mathematician, probably the most difficult point to understand in this digital verification process is how an attacker monitoring every aspect of the signature verification process (as someone most certainly will!) can be prevented from determining the private key used to perform the original digital signing. Protection of the private key is absolutely vital, for if an attacker gains access to the private key, he/she can then produce a unlimited number of messages which each appear to be authentic—when they are in fact each a fake.

But this is precisely the characteristic of the private/public key scheme—due to the mathematics involved it is "computationally unfeasible" to infer the private key given the message, digital signature and public key. (Note that as computers continue to become more powerful and the definition of "computational unfeasible" necessarily changes. The cryptographic response to this trend is longer key lengths.)

Returning to the proposed USPS PSD, we can now see why the PSD device must be a "FIPS-140 secure" computational platform. It must securely store a very critical private key, and use this key in the computation of a digital signature for each indicium created (postage transaction). If the private keys are successfully kept secret by the suppliers of the PSD (the meter manufacturers), and hackers fail to gain access to the secure areas of the PSD when these units are in the field, then there is no way for a hacker to emulate a "real" meter. To emulate a "real" meter, one would need a private/public key pair which is known to one of the meter manufacturers and/or the USPS.

The verification process in the USPS scheme occurs when the mail pieces are processed at Postal sites. The indicia would be scanned and the signature verification would proceed based on the public key embedded in the X.509 certificate. If the signature was authenticated, the mail piece would proceed through processing. If it didn't, it would be made a matter of formal investigation.

The Role of the X.509 Certificate

How does one know a public key is, in fact, authentic? For instance, how would one know that a given key is associated with the Pitney Bowes postage meter company, or the Neopost meter company?

If we didn't care about this issue, Mr. Joe Hacker could purchase some encryption software and generate his own private/public key set. He could then create his own IBIP indicia digitally signed with his private key, and finally include his public key. In absolute isolation, an auditor would only have the option of using the public key provided to verify the signature—and it would verify properly.

The purpose of an X.509 certificate is to verify that a public key is indeed the property of the entity with whom we think we are dealing. This ISO format simply presents the name of the entity (e.g., Neopost), their business address, their public key and some other information. But importantly, all of this specific information is digitally signed by yet another party—a so-called "trusted" party or Certificate Authority (CA). The CA has a well-known public key. The auditor has confidence both in the integrity of the CA and the value of it's public key.

Thus, the certificate authority's public key can be used to verify the public key embedded within the X.509 certificate. If that validates, the auditor can confidently use that public key to verify the indicium data stream.

Alternative Approaches to Key Management

The present invention provides mechanisms for greatly simplifying the way in which encryption keys are used to dispense postage, without compromising security, and for eliminating the use of a meter-specific key to encrypt the postage indicium printed on mail pieces. As a result, the amount of information stored in the postage indicium is greatly reduced, allowing the use of a much smaller postage indicium.

One extremely obviously advantage of this invention is that the private keys are always kept at the secure central computer—they are not spread around in PSD's at millions of distinct locations. Also, since postage indicia are created only at secure central computers, attackers are denied access to the physical entity that signs the postage indicia. But there are other potential advantages to this invention.

The classic public/private key strategy is used when two distinct entities are transferring information between one another, and the recipient needs a means to determine the authenticity of the encrypted message. The sender provides the recipient with a public key that permits authentication of the message without compromising the encryption methodology—particularly the private key which was used to create the message.

If the Postal Authority in a given country manages the secure central computer, or if there are only a handful of "secure central computers" run by commercial firms authorized by the Postal Authority, it is possible to dispense with the use of—or at minimum, eliminate the dissemination of—public keys. This is because the message (the postage indicium) is eventually routed back through the Postal Authority's infrastructure for physical delivery. In other words, the physical path that the indicium must follow is:

Postal Authority Secure Computer or Trusted Vendor's Secure Computer (Indicium Created)

Meter User (create entire mail piece with indicium)

Postal Authority's Mail Processing Infrastructure (authenticate indicium)

Destination Addressee.

Thus the authority that creates the encrypted indicium will always have the ability to re-check the integrity of the indicium after the meter user has deposited the mail piece in the physical delivery system. This is a relatively unique situation in the realm of electronic transactions which presents some interesting opportunities for simplification of the overall process.

Under one scenario, the Postal Authority and/or itts agents (represented by the secure central computers 102 in FIG. 4), could use a single key pair for all mail for a given period of time (say a month). Neither the private key or public key would be divulged to anyone outside of the Postal Authority. When mail was being authenticated, the postage meter date would immediately imply which key should be used for the authentication. In this scenario the indicium could completely dispense with the public key and the associated X.509 certificate (a 323 character savings). This reduces the size of the indicium footprint on the mail piece by approximately 60%.

Under another (more probable) scenario, the Postal Authority could decide to utilize a relatively small number of public/private key combinations (ranging from a less than 10 to perhaps several hundred thousand keys).

On the secure central computer, a key table would be maintained with all of the private keys to be used.

| Key ID | Private Key |
|---|---|
| 000001 | a$#c0q54 5445435 |
| 000002 | bzrawrx$$509a34 |
| 000003 | sg;jss3-05656jP{YRert |
| ... | ... |

A key ID might be assigned to a given meter number (e.g., a given customer) and used for each indicium produced for that customer, or keys might be used randomly for each indicium produced regardless of the customer. The indicium would contain however, the key ID, which could be easily represented as a 4 byte unsigned long integer. This is a net savings of 319 characters in the indicium.

Now, on the verification side, a central (non-secure) networked computer could be used by mail stream auditors could contain a mapping between the key ID and the public key. Alternately, the auditors could use thousands of standalone PC laptops equipped with a CD-ROM file containing the public key table. If these data were ever compromised or stolen, they would be of no practical use to attacker.

| Key ID | Public Key |
|---|---|
| 000001 | ABCDEFGHTI |
| 000002 | DSAAOFFAF! |
| 000003 | E130dAVXCR |

In this second scenario, the indicium would contain the standard digital signature and the internal Key ID for the public key (not the key itself). When authentication go occurred in the mail processing facility, the key ID would be used in a simple lookup table to find the required public key for that mail piece. Decryption and authentication could then proceed in a normal fashion. Once again, this approach replaces a 323 character X.509 certificate with a 4 character binary representation of an unsigned long integer and the indicium footprint is reduced by 60%.

The present invention also solves a major problem associated with key or certificate revocation. The Postal authority might decide to stop using a production key based on a security leak or other circumstances. With the keys all located in a central secure computer (or a very limited number of meter manufacturers secure computers), revocation could be done quickly and without any communication to a PSD device.

In a preferred embodiment, the postal authority computer 180 generates N public-private key pairs for each new time period. The N key pairs are the only key pairs to be used for postal indicia during a certain time period. For instance, a new set of N key pairs might be generated for each week, or each day. The postal authority computer 180 then distributes the N "public" keys to the secure central computers as an indexed set of N keys. In other words, each key will have an associated index value. For instance, if 100 key pairs are generated for each week, and a four digit index value is assigned to each key pair, index values can be assigned to each week's set of key pairs so that none of the index values for the current week's key pairs overlap with the index values for the key pairs of the previous couple of weeks. Different sets of N keys may be distributed to each of the secure central computers 102 so as to help isolate any security breaches. Since the only parties to ever have access to the postal indicia creation keys are the postal authority and the secure central computers, there is no need to use a large number of key pairs for postal indicia creation. In fact, especially if the postal indicia creation key pairs are updated frequently, such as every day or every week, it would probably be sufficient for each secure central computer to be assigned a single distinct postal indicia creation key for each such time period.

Also, in the context of postal indicia creation, the "public/private" labels on the two keys in each postal indicia creation key pair are somewhat meaningless in that neither key is ever publicly used. While this document may state that the "private" key from the pair is used for postal indicia creation and the "public" key is used for postal indicia verification, in fact both keys are kept confidential at all times. Thus, for the purposes of this document the two keys in each postal indicia creation key pair may also be called the postal indicia creation key and the postal indicia verification key.

Postal Authority Computer System and Postal Indicium Validation Procedure

Figure 7:
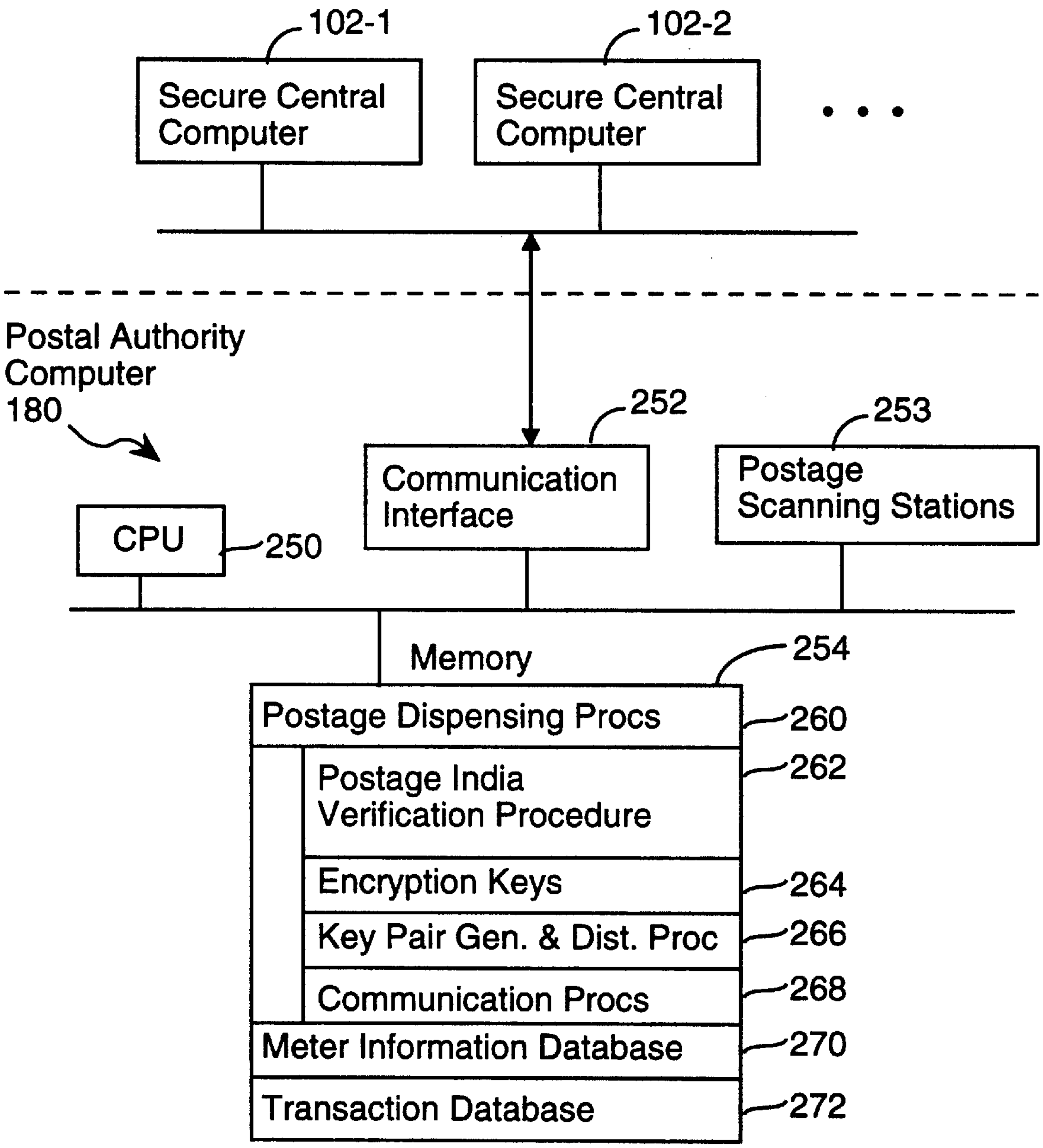
FIG. 7 depicts a postal authority computer system in accordance with the present invention.

Referring to FIG. 7, each postal authority system 180 for processing mail pieces will preferably include at least one data processor 250, a communication interface 252 for transferring information to and from the secure central computers 102, postage scanning stations 253, and memory 254.

Memory 254, which will typically include both random access memory and non-volatile disk storage, preferably stores a set of postage management procedures 260, including:

- a postal indicia verification procedure 262;
- a set of encryption keys 264, including keys used by the secure central computers 102 for generating the digital signatures in postal indicia, the keys for verifying postal indicia, and keys for secure communications with the secure central computers 102;

an encryption key generation and distribution procedure 266 for generating new encryption key pairs for generating and validating postal indicia, and for securely transmitting the generated encryption keys to the secure central computers 102;

a communication procedure 268 for handling communications with the secure central computers 102.

Memory 254 in the postal authority computer system 180 also preferably stores:

a meter information database 270 of information about each licensed postage meter, including electronic postage indicia end user computers; and a transaction database 272 for storing records concerning every postage indicium validated or rejected by the postal authority computer system 180.

The meter information database 270 includes a small subset of the information in the customer database 172 in the secure central computers 102, and in particular just the information needed for verifying postal indicia. Updated data concerning all licensed "meters" (i.e., end user computers) is preferably downloaded from the secure central computers periodically, such as once a day. In addition, to the information retrieved from the secure central computers, the meter information database preferably will also include a compact serial number usage bit map, or equivalent mechanism, for keeping track of all serial numbers used by each licensed meter in the last week or so. The serial number usage bit map is updated every time a mail piece postage indicium is authenticated, and provides a quick mechanism for detecting duplicate postal indicia, which would expected to be the most common form of attempted fraud. As a result, the transaction database 272 is accessed only for (A) storing records of authenticated and rejected mail pieces, and (B) postal indicia error and fraud investigations. The size of the bit map is preferably variable so as to accommodate high volume accounts, ranging from a couple of hundred bits for low volume accounts to perhaps a 10K bits or more for the most active accounts. A preferred format of the serial number usage bit map within the database record for each licensed meter account is:

Bit Map base serial number;

Bit map size;

Serial Number Bit map array.

Figure 8:
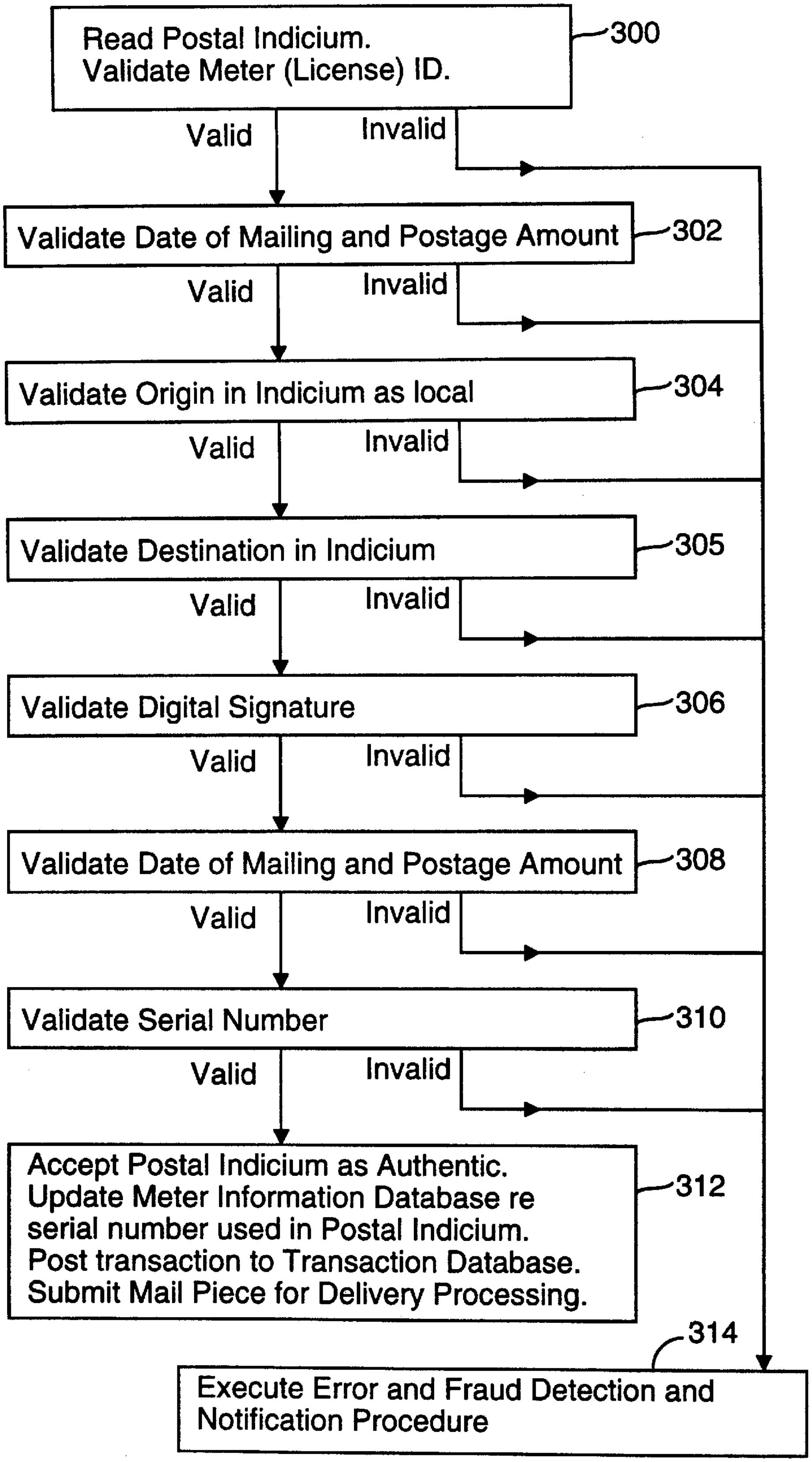
FIG. 8 is a flow chart depicting the postal indicium validation procedure performed by a postal authority system in a preferred embodiment of the present invention.

FIG. 8 represents a preferred embodiment of the postal indicium validation procedure performed by each postal authority system 180. It should be noted that the order of the validation steps in the procedure is completely variable and will likely vary from implementation to implementation. In the preferred embodiment, the preliminary validation steps (300, 302, 304) are similar to those that would be used for validating ordinary postage meter indicia, and the subsequent validation steps (306, 308, 310) are the additional steps used for validating digital postal indicia generated in accordance with the present invention. However, while the order of validation steps shown in FIG. 8 is believed to be computationally efficient, there is no technical reason that the order of validation steps cannot be completely different.

In the preferred embodiment, the postal indicium validation procedure first reads the postal indicium on a mail piece and validates the meter identifier (also called a license identifier) in the postal indicium by checking to see if the meter identifier corresponds to a valid account in good standing (300). If this, or any other validation step determines that the postal indicia is invalid, an error and fraud detection and notification procedure is executed (314) that analyzes as completely as possible the postal indicium, the relevant data in the meter information database 270 and transaction database 272 and generates a corresponding report so that the appropriate postal authority personnel can determine what action to take in response to the submission of the mail with an invalid postal indicium.

Next, the mailing date encoded in the postal indicium and the postage amount are validated (302). The mailing date must be within a predefined number of days of the current date. For instance, postal indicia may expire after 7, or perhaps, 3 days of their issuance by a secure central computer. The postage amount validation requires input regarding the mail piece's weight, as determined by the postage scanning station 253 processing the mail piece, the class of postal service indicated in the postal indicium, and the postage amount indicated in the postal indicium. If either the postal indicium's date is expired and the postage amount is incorrect, the postal indicium is rejected as invalid (302).

The mail piece's origin is also validated by verifying that the origin indication in the postal indicium (e.g., a ZIP+4+2 indication for origins in the United States) is within the geographic region services by the postal authority computer system 180 that is processing the mail piece (304). This validation step is needed to prevent theft of postal indicia from one region of a country and use in another region where the postal authority computer system may not have sufficient data to fully validate the postal indicia.

The mail piece's destination is validating by comparing the destination indication in the postal indicium (e.g., a ZIP+4+2 indication for origins in the United States) with the destination printed on the mail piece (305). If the two do not match, this is a indication of likely fraudulent use of a postal indicium and is treated as such.

If validation steps 300, 302, 304 and 305 are passed, the next step is to validate the digital signature in the postal indicium (306). This step is performed by (A) decrypting the digital signature in the indicium, using the "public" key corresponding to the key identifier in the postage indicium, to generate a first message digest, (B) generating a second message digest using the same digest function used by the secure central computer when it generated the digital signature, and (C) comparing the first and second message digests. If the two message digests are identical, the digital signature is validated, otherwise it is invalid. The digest function used to generate the message digest may vary over time or from one secure central computer to another, and the particular function used may be indicated by the inclusion of a software version identifier or the like in the postal indicium.

If steps 300, 302, 304 and 306 are all passed, this indicates only that postal indicium was in fact generated by a secure central computer for a mail piece of the same approximate weight as the mail piece being processed and that was to be mailed from the geographic region services by the postal authority computer system 180. Validation step 310 is used to detect fraud by duplication of otherwise valid postal indicium. In particular, the serial number in the postal indicia is validated at step 310 by checking the meter information database 270 to ensure that the same serial number for the meter associated with the postal indicia has not been previously used, and is within the range of "expected" serial numbers associated with the meter. If the serial number in the postal indicia is outside the range of expected serial numbers, this indicates either a problem with the meter, unexpectedly high meter usage, or a much more serious security breach in which someone has managed to generate counterfeit postal indicia that have otherwise valid digital signatures.

If the serial number in the postal indicium has not been previously used, and is within the range of expected serial numbers for the corresponding meter, the postal indicium is validated (310).

After the postal indicium has been completely validated, the postal indicium is accepted as valid, the meter information database is updated to reflect the serial number used by the postal indicium, the postal indicium is posted as a transaction to the transaction database, and the mail piece is submitted for normal delivery processing (312).

In summary, the present invention greatly simplifies the distribution and management of cryptographic keys and offers the potential for a vastly reduced indicium size.

An Enumeration of the Advantages of The Present Invention

The following are advantages of the present invention:

1. Elimination of the PSD Itself: The USPS-proposed PSD must use an relatively expensive ($40–$50/unit) CPU which has FIPS-140 certification. Early PSD designs are focusing on 32 bit RISC processors which embedded DES encryption software. The PSD typically must have a separate power supply and long term backup battery—all of which add to unit cost. Software development for these devices is significantly slower and more difficult, and units must have software burned into ROM to maintain FIPS level security. than on other plafforms. The present invention completely eliminates the local PSD hardware and instead places its functionality on the secure central computer (where the necessary software is much easier to write, refine and maintain).

2. Elimination of "Cradle-to-Grave" Hardware Tracking: This invention completely eliminates the need to track the physical location of PSD's nationwide which is an extremely complex and costly requirement. Again, the functions classically performed by the PSD are now handled by the secure central computer.

3. Elimination of Secure Key Tracking and Management: This invention maintains all encryption keys at secure sites. The keys used for generating postal indicia are only required at the secure host computer and at the postal agencies (e.g. USPS) mail processing facilities. No postal indicia creation keys are stored at the user's site and therefore the onerous task or distributing, tracking and maintaining keys at millions of local user sites is completely eliminated.

The only encryption keys maintained by end user computers are communication session keys for maintaining the confidentiality of user to secure central computer communications. Since these session keys are not required for preserving the integrity of the postal indicia creation process, the session keys can be symmetric keys, such as the keys used for DES encryption and decryption. Alternately, public-private key pairs can be used to encrypt and decode user-central secure computer communications, but public-private key encryption is generally more computationally expensive and is not absolutely necessary.

Further, this invention offers the possibility of not including actual keys in the indicium data stream, but rather reference numbers to the actual keys. This is made possible by the fact that the governing postal authority could be the dispensing agent for all indicium and, under those circumstances, the encryption and sub-subsequent verification of the indicium would be done by the same party—the postal authority.

4. Rate Integrity: A frequent concern of all postage agencies is that local postage rates, either in printed or electronic form, be both accurate and current so that metering is accurate. This invention uses the central secure computer as the ultimate calculator of rates on each piece. Each electronic mail piece indicium request contains the service class requested (e.g. First Class, Express), the weight of the piece, the geographic distances involved (e.g. zone related charges), and any other rate-impacting issues such as oversize letters. The correct rate information need only be maintained at the central site—not at millions of user's sites.

5. Date and Time Integrity: Postmark dates are used in a variety of important situations, including the verification of timely submission of tax returns, payments, and applications of all types. Postmarks are also used by independent auditors to gauge mailing agency delivery performance. Current meters are susceptible to date manipulation—such as backdating—and postal agencies are united in their desire to end this practice.

The USPS IBIP program calls for a time reference independent of, say, a personal computer since a PC clock can be easily altered. The present invention maintains a master time and date reference on the secure central computer (adjusted for time zone depending upon customer location). Thus the indicium date/time information assured without the need for a local secure PSD.

6. Integral Address Validation: A requirement for the USPS IBIP is that all addresses must be matched and verified against a national database to ensure that the mail piece will be deliverable. The present invention integrates this address verification with rate computation and indicium generation—all at the secure central computer site.

7. Early Collection of Critical Operational Data: Since the present invention calls for a complete package of information on the mail piece, including weight, destination, and so on, to be transmitted to the secure central computer for each indicium, the secure central computer will be a data repository which can guide the Postal agencies operations for that day. The data can be used to project mail volumes at both the origin and destination mail processing sites, serve as a trigger for customer package pickups (e.g., Express Mail services), provide some early notice of special mail piece requirement (e.g., particularly heavy packages), and assist in the deployment of vehicles and personnel.

8. Mail Piece Tracking: Tracking of mail pieces can actually begin prior to the piece being actually physically transferred to the care of the postal agency. And, scanning requirements of the piece as it moves through the mail stream can be reduced as key data have already been collected at the instant the postage indicium was disseminated to the end user.

9. Refunds: The USPS currently refuses to consider customer refunds for misprinted or otherwise unused indicia. This is potentially a very significant negative roadblock to wide spread acceptance of this IBIP concept. The fact that the indicium is created at the same instant as the rest of the mail piece, increases the probability that the piece may be deemed unacceptable by the end user (due to a printer jam, toner smudging, paper wrinkling or mis-alignment). Part of the rationale for the USPS's current position is that the USPS IBIP concept creates the indicium at the local site using the PSD, and that the log of matching addresses is to be kept in a non-secure disk-based file. The net impact is that the USPS has no conveniently accessible data that will verify the authenticity of an indicium or if a copy of it has already been used in the mail stream. The present invention gives the USPS greater of confidence in the indicium since a secure computer created it and the underlying raw data is available at the secure site. This, in turn, increases the likelihood that the postal authority will allow refunds.

If mail indicia automatically expire X days after issuance, the user could simply wait for X days after an unused postage indicium (e.g., due to misprinting or non-use due to the submission of an incorrect address when requesting the postage indicium) and request a refund. The postal authority could check its database to verify that an indicium with the date, meter number and serial number of the allegedly misprinted indicium was never received and processed by the USPS. Since the database of the secure computer used to dispense the postage indicium will verify the date, meter number and serial number of the allegedly misprinted indicium there is no risk that the postal service would issue a refund for a postage indicium that was previously used or useable in the future.

10. Potential for Smaller Printed Indicium: The present invention offers an opportunity to greatly reduce the information carried by the indicium by transferring relevant data to the secure computer when the indicium is requested, and storing that data in a transaction database. For instance, the complete mailing address could be transmitted to the secure central computer and the resulting indicium data stream would simply carry the ZIP+4+2 and or carrier route for that piece. This would be provide sufficient synchronization data in the indicium to cross check against the physical address, but not take the space of an entire address (e.g. The Whitehouse, 1600 Pennsylvania Ave, Washington, DC 20240-1101 would be represented in the indium as 20240110100). If the complete address was required, it could be obtained by matching the unique mail piece meter number and serial number (embedded in the indicium) with the data record stored at the secure site. Data such as piece weight and service class might be omitted from the indicium since they could be referenced in the data record on the secure computer.

An additional technique to reduce indicium size is to carry only a short numerical ID for the public key in the indicium data stream rather than the key (and associated X.509 certificate). This ID would be cross referenced to the actual key when the mail piece was processed by the postal authority.

11. Potential for Use of this Technology at Retail Postal Outlets: The 45,000+Post Office locations in the US (as well as similar sites worldwide) would be well served by the present invention. Typical counter transactions involve a customer physically presenting a mail piece to a postal retail specialist. The postal official confirms weight and rate, and then prepares a meter strip using a printer which operates much like a conventional meter. The USPS goal is to be able to produce IBIP meter strips in the future. Current USPS plans call for an PSD-type secure device to work in conjunction with the printer. The present invention offers a much less costly and more secure approach than currently being considered by the USPS. The user interface might not be a full-PC environment, but the fundamental concept would be the same as the invention described here. The key data to be transmitted to the central secure computer could be transmitted from an electronic scale in combination with a keypad transcription of the address or OCR read of the same information. Once this information was received, a meter strip (with or without a human readable address) could be produced and applied immediately to the mail piece.

12. "Conventional Meters" Can Adopt this New Protocol: Conventional meters will continue to be in the marketplace. Their key attributes are that they maintain a local postage balance, and that the preparation the physical mail piece is typically a distinctly separate task from the metering operation. For example, a package may be prepared on the 3rd floor of a company, taken to the mail room in the based, and posted there. A major security issue would be solved by eliminating the locally stored postage balance. As pre-addressed mail pieces were received, they could be posted and metered in the same manner described for the retail postal office outlets.

13. The present invention eliminates the need for an additional communications port on the Use's PC. The elimination of the PSD hardware at the local site has another rather mundane but operationally significant benefit. The PSD will generally require a dedicated PC serial port for communications with the local host. The overall PC-based meter concept also requires a serial port for a modem. Finally many current-day PC's use a dedicated serial port for a mouse pointer device. Many PC's support only two CPU interrupts for the four serial ports available in most PC's. That means serial ports must often share IRQ's. Typically, serial port COM1 and COM3 share a single interrupt and COM2 and COM4 share another. During certain PSD transactions, mouse, modem and PSD communications will occur simultaneously. Since there are only two IRQ's available for three serial communications tasks, conflicts are unavoidable. By completely eliminating the local PSD hardware, this issue is avoided entirely.

14. Prevention of Customer Losses due to PSD/Meter Failure, Loss or Destruction: In a conventional postage meter or the USPS-proposed PSD, a local postage balance is maintained in some form of secure hardware environment at the user's site. If the device malfunctions, is destroyed by fire, or is stolen, the customer will generally suffer the loss of his or her postage balance. The present invention maintains every customer's balance at a secure, professionally-managed central site which incorporates industry-standard redundancy and backup procedures.

15. Support for Batch Mode Transactions: While the preferred embodiment of the present invention uses a transaction with the secure central computer for each indicium produced, it is possible to provide some level of batch processing, which would reduce the number of discrete transactions. For instance, if a user pre-selected 10 addresses for batch printing of 10 mailing labels, the present invention can accommodate a single transaction which passes all 10 indicia requests to the secure central computer in a single message. The secure central computer would reply with 10 indicium data streams, packaged either as a single large message or as 10 smaller messages. The software running at the user's host PC would then simply ensure that the labels were printed in a synchronized fashion—that is the human readable address on each label would be matched with the appropriate indicium.

This approach might, at first glance, sound more like a conventional meter (or the PSD) whereby a lump sum is downloaded to the device and subsequently dispensed in smaller chunks. But the present invention is different in that it permits the download of postage for more than one mail piece per transaction with the secure central computer, but the user must completely specify beforehand how and where this postage will be used—on a piece-by-piece basis.

16. World Wide Applicability: While much of this document sites rules, specifications, and protocols unique the United States Postal Service, the invention described here is equally useful for any and all postal agencies worldwide.

Delivery address information can still be imbedded in the indicium (whether or not the country uses a ZIP type address coding), address verification can still be accomplished by the secure central computer (for example, Canada, the UK and France all maintain a national database of addresses with some form of postal code associated with each delivery address), decryption of the indicia can still be accomplished at secure mail processing facilities, and so on.

17. Secure Central Computer(s): The invention allows for a wide spectrum of business/operational arrangements. Most logically, the postal authority for the country would take on this responsibility (e.g., the USPS). One would argue that these agencies would be able to maintain the highest level of security, would have the necessary capital and personnel resources, would gain the most from the detailed address information captured from each transaction (insofar as guiding daily operations). Additionally, this agency would be the only entity which holds the encryption and decryption keys. No one else would have them or need them. However the invention also contemplates the establishment of secure central computers that are maintained by private firms licensed by the postal agency and regularly inspected by that agency. For example, Pitney Bowes or Neopost might perate secure central computers for their respective customer bases. The overriding enet of the invention is that there will be relatively few of these secure central sites.

18. Large Corporate Solutions—A IntraNet-Based Secure Computer: Many large firms maintain a private IntraNet which is a collection of PC's and networks isolated from the World Wide InterNet. This is done for obvious security reasons—all data transferred within the confines of the IntraNet is completely protected. Another embodiment of this invention can be a secure central computer which is dedicated to a particular organization. The secure central computer might be licensed or rented from the governing postal agency for specific us only by the corporate customer. The cost of this secure computer (and any secure environmental conditions that might be required by the governing postal agency or an authorized postal vendor), even if relatively substantial, would not be a overly critical issue because that single computer will be serving the entire corporation. The basic principals of this invention would still be maintained—individual users would not have local PSD's. The function of the PSD would again be centralized.

For instance, a firm the size of American Telephone and Telegraphic might consider a $200,000 investment in their own corporate secure postal computer to be very reasonable. Their users would be able to rely upon the relative stability of the internal corporate network for postage access, destination addresses would never be transmitted outside of the corporate IntraNet during indicium request, all "local" postage meters throughout the entire company could be eliminated, and individual and/or departmental billing records for mail costs could be maintained and tracked by the company in a central site.

This approach still honors the basic tenant of this invention. Keep the number of secure computer sites limited and avoid the installation of millions of PSD's (with the attendant security problems and costs) at end user locations.

19. Vendors collect funds from end users and deposit these funds in accounts maintained by the vendor. After a period of time, the funds are transferred to USPS accounts. During this transitional period, the Potentially Faster Receipt of Funds for Postal Authority: In the US marketplace, conventional meter manufacturers can and do earn substantial interest on the "float". The USPS has consistently objected to this procedure and has placed increasing pressure on the vendors to move funds more quickly to the USPS or turn over the interest earnings from the "float" to the USPS.

As pointed out elsewhere in this document, there are considerable benefits for the governing postal authority to operate the central secure computer. The elimination of the "float" issue is yet another advantage for the postal agency. This invention provides the postal agency the opportunity to be the initial (and ultimate) recipient of all postage funds.

20. Since the present invention employs no secure hardware at the user's site, there is no need for local inspection of user meters. At any sign of improper usage, postage dispensing can be curtailed at the secure central computer for any account. This contrasts with conventional meter technology and the proposed USPS IBIP system, which could continue to produce posted pieces until the local balance was exhausted.

What is claimed is:

1. A system for electronic distribution of postage, comprising:

a secure computer for generating postage indicia on behalf of a plurality of user accounts, the secure computer including:

a communications port for receiving postage requests from end user computers, each received postage requests having request data defining a postage indicium to be created, including user account data;

a database of information concerning user accounts of users authorized to request postal indicia from the secure computer;

a request validation mechanism for authenticating each received postage request with respect to the user account information in the database; and a postal indicia creation and distribution mechanism for applying a secret encryption key to information in each authenticated postage request so as to generate a digital postage indicium that is at least partially encrypted with the secret encryption key, and for securely transmitting the generated digital postage indicium to the end user computer that sent a corresponding one of the postage requests;

wherein the postal indicia creation procedure applies one of a plurality of secret encryption keys to each authenticated postage request in accordance with predefined key assignment criteria;

the digital postage indicium includes a first portion, not encrypted with the secret encryption key, that includes information sufficient to enable a postal indicium validation procedure to identify the secret encryption key used to encrypt the encrypted portion of the digital postage indicium, and to decrypt the encrypted portion of the digital postage indicium; and the generated digital postage indicium is formatted in a manner suitable for printing on a mail piece or mailing label by the end user computer in a predefined bar code format.

2. A system for electronic distribution of postage, comprising:

at least one secure central computer for generating postage indicia in response to postage requests submitted by end user computers, the secure central computer including:

a data processor;

a database of information concerning user accounts of users authorized to request postal indicia from the secure central computer;

a request validation procedure, executable by the data processor, for authenticating each received postage request with respect to the user account information in the database;

a postal indicia creation procedure, executable by the data processor, for applying a secret encryption key to information in each authenticated postage request so as to generate a digital signature and for combining the information in each authenticated postage request with the corresponding generated digital signature so as to generate a digital postage indicium in accordance with a predefined postage indicium data format; and a communication procedure, executable by the data processor, for securely transmitting the generated digital postage indicium to the end user computer that sent a corresponding one of the postage requests;

wherein the postal indicia creation procedure applies one of a plurality of secret encryption keys to each authenticated postage request in accordance with predefined kev assignment criteria; and the digital postage indicium generated by the postal indicia creation procedure includes a first portion, not encrypted with the secret encryption key, that includes information sufficient to enable a postal indicium validation procedure to identify the secret encryption key used to generate the digital signature of the digital postage indicium and to decrypt the digital signature of the digital postage indicium;

each of the end user computers including:

a data processor;

a communication procedure for sending postage requests to one of the at least one secure central computers at which a user account has been established, and for receiving from the one secure central computer a corresponding digital postage indicium; and a postage indicium printing procedure for printing a postage indicium in accordance with the received digital postage indicium.

3. The system of claim 2, at least a subset of the postage requests each including: a user account identifier that identifies a previously established user account, a source address identifier indicating where a mail piece is to be mailed from, a destination address identifier indicating where the mail piece is to be mailed to, authentication information for authenticating that the postage request is from an end user associated with the specified user account identifier, and data concerning the package size and/or weight sufficient to determine an amount of postage required for the mail piece;

wherein at least a subset of the generated digital postal indicia each include data representing the user account identifier, source address identifier, and destination address identifier in a corresponding on of the postage requests.

4. The system of claim 2, wherein the secret encryption key used to create the digital signature in each secure central computer is one of a plurality of secret encryption keys, each of which is assigned a corresponding unique key identifier; and each generated digital postal indicium includes data representing the key identifier of the secret encryption key used to generate the digital signature in that digital postal indicium.

5. The system of claim 4, further including at least one postal authority subsystem that includes:

a data processor;

a database of information concerning the user accounts;

a postal indicium validation procedure, executable by the data processor, for authenticating the postal indicium on a mail piece, including instructions for decrypting the digital signature in the postal indicium using a decryption key corresponding to the key identifier in the postal indicium.

6. A method of generating and distributing digital postage indicia, comprising:

at a secure computer, storing a database of information concerning user accounts of users authorized to request postal indicia from the secure computer;

receiving postage requests from end user computers, each received postage request having request data defining a postage indicium to be created, including user account data;

authenticating each received postage request with respect to the user account information in the database;

applying a secret encryption key to information in each authenticated postage request so as to generate a digital postage indicium that is at least partially encrypted with the secret encryption key; and securely transmitting the generated digital postage indicium to the end user computer that sent a corresponding one of the postage requests;

wherein the applying step applies one of a plurality of secret encryption keys, the secret encryption key applied to each particular authenticated postage request being determined in accordance with predefined key assignment criteria;

the digital postage indicium generated by the applying step includes a first portion, not encrypted with the secret encryption key, that includes information sufficient to enable a postal indicium validation procedure to identify the secret encryption key used to generate the digital postage indicium and to decrypt a second, encrypted, portion of the digital postage indicium; and the generated digital postage indicium is formatted in a manner suitable for printing on a mail piece or mailing label by the end user computer in a predefined bar code format.

7. The method of claim 6, at least a subset of the postage requests each including: a user account identifier that identifies a previously established user account, a source address identifier indicating where a mail piece is to be mailed from, a destination address identifier indicating where the mail piece is to be mailed to, authentication information for authenticating that the postage request is from an end user associated with the specified user account identifier, and data concerning the package size and/or weight sufficient to determine an amount of postage required for the mail piece;

wherein at least a subset of the generated digital postal indicia each include data representing the user account identifier, source address identifier, and destination address identifier in a corresponding on of the postage requests.

8. The method of claim 7, wherein each of the plurality of secret encryption keys is assigned a corresponding unique key identifier; and each generated digital postal indicium includes data representing the key identifier of the secret encryption key used to generate the second, encrypted, portion of that digital postal indicium.

9. The method of claim 8, further including at a postal authority system, receiving a mail piece having a digital postal indicium printed thereon;

authenticating the digital postal indicium on the received mail piece, including decrypting the second, encrypted, portion of the postal indicium using a decryption key corresponding to the key identifier in the digital postal indicium.

10. The method of claim 9, wherein the second, encrypted, portion of the digital postal indicium includes a digital signature of at least a portion of the digital postal indicium.

11. The method of claim 8, wherein the second, encrypted, portion of the digital postal indicium includes a digital signature of at least a portion of the digital postal indicium.

12. The method of claim 8, wherein the encrypted portion of the digital postal indicium includes a digital signature of at least a portion of the digital postal indicium.

* * * * *